United States Patent
Kondo et al.

(10) Patent No.: US 8,095,952 B2
(45) Date of Patent: Jan. 10, 2012

(54) MOBILE TERMINAL DEVICE, CONTROL METHOD THEREOF, PROGRAM, AND SEMICONDUCTOR DEVICE

(75) Inventors: Satoshi Kondo, Kyoto (JP); Hisao Sasai, Osaka (JP); Takahiro Nishi, Nara (JP); Tadamasa Toma, Osaka (JP); Toshiyasu Sugio, Osaka (JP)

(73) Assignee: Panasonic Corporation, Osaka (JP)

( * ) Notice: Subject to any disclaimer, the term of this patent is extended or adjusted under 35 U.S.C. 154(b) by 635 days.

(21) Appl. No.: 11/579,337

(22) PCT Filed: May 17, 2005

(86) PCT No.: PCT/JP2005/008953
§ 371 (c)(1),
(2), (4) Date: Nov. 1, 2006

(87) PCT Pub. No.: WO2005/120052
PCT Pub. Date: Dec. 15, 2005

(65) Prior Publication Data
US 2009/0064233 A1  Mar. 5, 2009

(30) Foreign Application Priority Data
Jun. 2, 2004 (JP) .................................. 2004-165028

(51) Int. Cl.
*G06F 3/00* (2006.01)
*G06F 13/00* (2006.01)
*H04N 5/445* (2006.01)
*H04N 7/16* (2006.01)

(52) U.S. Cl. ................. 725/40; 725/37; 725/43; 725/58; 725/139; 725/141; 725/142

(58) Field of Classification Search .................... 725/89
See application file for complete search history.

(56) References Cited

U.S. PATENT DOCUMENTS

| 6,215,993 | B1* | 4/2001 | Ulveland ...................... 455/415 |
| 6,253,231 | B1* | 6/2001 | Fujii ............................. 709/206 |
| 6,943,845 | B2* | 9/2005 | Mizutome et al. ............ 348/555 |
| 2002/0031327 | A1 | 3/2002 | Watanabe et al. |

(Continued)

FOREIGN PATENT DOCUMENTS

CN   1327678   12/2001

(Continued)

OTHER PUBLICATIONS

Supplementary European Search Report (in English language) issued Jan. 30, 2009 in European Application No. 05744128.9.

(Continued)

*Primary Examiner* — Justin Shepard
(74) *Attorney, Agent, or Firm* — Wenderoth, Lind & Ponack, L.L.P.

(57) ABSTRACT

In order to avoid a collision of a reserved viewing of television broadcasting with a different operation mode and also to realize the avoidance by simple and easy operation, a television-equipped mobile terminal device of the present invention is composed of: a reservation storage unit 111 which holds a start time at which a television reproduction for a reserved viewing is to be started; and a control unit 122 which performs a control so that the television reproduction is started at the start time and which determines the current operation mode of the mobile terminal device. The control unit further controls the determined operation mode and the television reproduction for the reserved viewing.

9 Claims, 16 Drawing Sheets

U.S. PATENT DOCUMENTS

| | | | |
|---|---|---|---|
| 2002/0059596 A1 | 5/2002 | Sano et al. | |
| 2003/0009772 A1* | 1/2003 | Karr | 725/142 |
| 2003/0048381 A1* | 3/2003 | Glatt | 348/563 |
| 2003/0064762 A1 | 4/2003 | Tanabe et al. | |
| 2003/0097659 A1* | 5/2003 | Goldman | 725/89 |
| 2004/0052504 A1 | 3/2004 | Yamada et al. | |
| 2004/0055011 A1 | 3/2004 | Bae et al. | |
| 2004/0093619 A1* | 5/2004 | Cox | 725/110 |
| 2004/0095463 A1 | 5/2004 | Yabuta | |
| 2004/0117831 A1* | 6/2004 | Ellis et al. | 725/53 |
| 2004/0154040 A1* | 8/2004 | Ellis | 725/58 |
| 2004/0204020 A1 | 10/2004 | Kuramitsu | |
| 2004/0214610 A1* | 10/2004 | Tanemura et al. | 455/566 |
| 2004/0237112 A1* | 11/2004 | Wasilewski et al. | 725/86 |
| 2005/0026603 A9* | 2/2005 | Rajaram | 455/419 |
| 2005/0166230 A1* | 7/2005 | Gaydou et al. | 725/41 |
| 2005/0207726 A1* | 9/2005 | Chen | 386/46 |

FOREIGN PATENT DOCUMENTS

| | | |
|---|---|---|
| CN | 1364027 | 8/2002 |
| CN | 2583894 | 10/2003 |
| CN | 1496122 | 5/2004 |
| EP | 1 398 947 | 3/2004 |
| JP | 2000-56944 | 2/2000 |
| JP | 2000-196776 | 7/2000 |
| JP | 2001-333414 | 11/2001 |
| JP | 2002-101391 | 4/2002 |
| JP | 2002-158747 | 5/2002 |
| JP | 2003-51993 | 2/2003 |
| JP | 2003-101921 | 4/2003 |
| JP | 2003-110666 | 4/2003 |
| JP | 2003-110955 | 4/2003 |
| JP | 2003-111004 | 4/2003 |
| JP | 2003-163868 | 6/2003 |
| JP | 2003-188952 | 7/2003 |
| JP | 2003-329459 | 11/2003 |
| JP | 2004-7537 | 1/2004 |
| JP | 2004-112807 | 4/2004 |
| JP | 2004-153333 | 5/2004 |
| JP | 2005-130132 | 5/2005 |
| JP | 2005-217523 | 8/2005 |
| WO | 01/31915 | 5/2001 |

OTHER PUBLICATIONS

English translation of paragraph [0014] for JP 2003-163868.
Office Action issued Apr. 14, 2011 in corresponding European Application No. 05 744 128.9.
Machine translation of Japanese Patent Application Publication No. 2003-110955, published Apr. 11, 2003.

* cited by examiner

FIG. 2
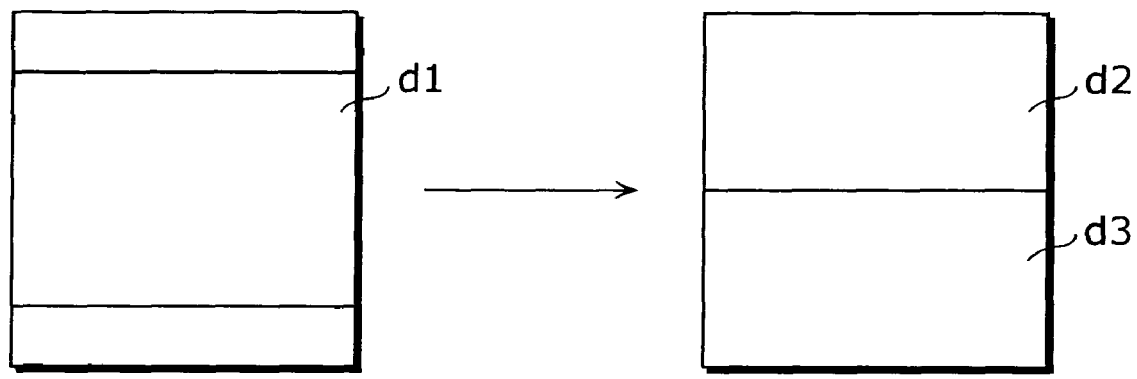
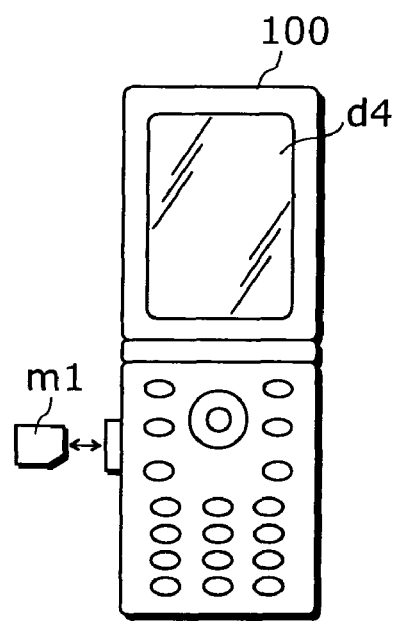
FIG. 3A
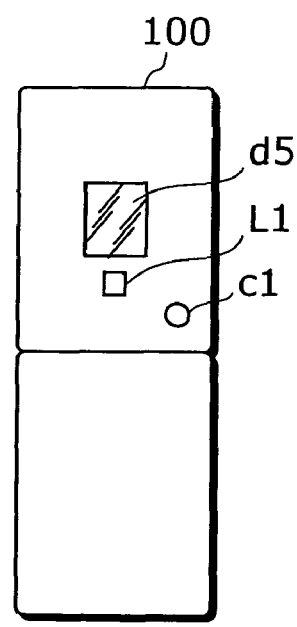
FIG. 3B

FIG. 5

| SET VALUE TABLE ||
|---|---|
| FIRST SET VALUE | 1 |
| SECOND SET VALUE | 1 |
| THIRD SET VALUE | 1、1、1 |
| FOURTH SET VALUE | 1 |
| FIFTH SET VALUE | 1 |

FIG. 6A

| | FIRST SET VALUE (FOR EMAIL CREATION MODE) |
|---|---|
| 1 | SAVE EMAIL AND START TV DISPLAY |
| 2 | CONTINUE TO CREATE EMAIL USING SCREEN SPLITTING AND START TV DISPLAY |
| 3 | CONTINUE TO CREATE EMAIL USING DOUBLE SCREEN DISPLAY AND START TV DISPLAY |
| 4 | CONTINUE TO CREATE EMAIL AND START TV RECORDING |
| 5 | INQUIRE OF USER WHICH ONE TO SELECT FROM AMONG 1 TO 4 |

FIG. 6B

| | SECOND SET VALUE (FOR REPRODUCTION MODE) |
|---|---|
| 1 | STOP REPRODUCTION FROM RECORDING MEDIUM AND START TV DISPLAY |
| 2 | CONTINUE REPRODUCTION FROM RECORDING MEDIUM AND START TV RECORDING |
| 3 | USE SCREEN SPLITTING, CONTINUE REPRODUCTION, AND START TV DISPLAY |
| 4 | USE DOUBLE SCREEN DISPLAY, CONTINUE REPRODUCTION, AND START TV DISPLAY |
| 5 | INQUIRE OF USER WHICH ONE TO SELECT FROM AMONG 1 TO 4 |

FIG. 6C

| | THIRD SET VALUE (FOR COMMUNICATION MODE) |
|---|---|
| | FIRST PARAMETER (FOR VOICE CALL MODE) |
| 1 | CONTINUE VOICE CALL AND START TV RECORDING |
| 2 | CONTINUE VOICE CALL AND START TV DISPLAY |
| 3 | CONTINUE VOICE CALL AND CANCEL TV DISPLAY |
| 4 | INQUIRE OF USER WHICH ONE TO SELECT FROM AMONG 1 TO 3 |
| | SECOND PARAMETER (FOR VIDEO CALL MODE) |
| 1 | CONTINUE VIDEO CALL AND START TV RECORDING |
| 2 | USE SCREEN SPLITTING, CONTINUE VIDEO CALL, AND START TV DISPLAY |
| 3 | USE DOUBLE SCREEN DISPLAY, CONTINUE VIDEO CALL, AND START TV DISPLAY |
| 4 | CONTINUE VIDEO CALL AND CANCEL TV DISPLAY |
| 5 | INQUIRE OF USER WHICH ONE TO SELECT FROM AMONG 1 TO 4 |
| | THIRD PARAMETER (FOR DATA COMMUNICATION MODE) |
| 1 | CONTINUE DATA COMMUNICATION AND START TV RECORDING |
| 2 | USE SCREEN SPLITTING, CONTINUE DATA COMMUNICATION, AND START TV DISPLAY |
| 3 | USE DOUBLE SCREEN DISPLAY, CONTINUE DATA COMMUNICATION, AND START TV DISPLAY |
| 4 | CONTINUE DATA COMMUNICATION AND CANCEL TV DISPLAY |
| 5 | DISCONNECT DATA COMMUNICATION AND START TV DISPLAY |
| 6 | INQUIRE OF USER WHICH ONE TO SELECT FROM AMONG 1 TO 3 |

FIG. 6D

| | FOURTH SET VALUE (FOR FOLDED MODE) |
|---|---|
| 1 | START TV RECORDING AND MAKE NOTIFICATION |
| 2 | SET TV DISPLAY ON STANDBY AND MAKE NOTIFICATION |
| 3 | INQUIRE OF USER ABOUT SELECTION AS TO NOTIFICATION AND RECORDING/DISPLAY |

FIG. 6E

| | FIFTH SET VALUE (FOR STANDBY MODE) |
|---|---|
| 1 | START TV DISPLAY AND MAKE NOTIFICATION |
| 2 | START TV DISPLAY AND MAKE NO NOTIFICATION |

MOBILE TERMINAL DEVICE, CONTROL METHOD THEREOF, PROGRAM, AND SEMICONDUCTOR DEVICE

TECHNICAL FIELD

The present invention relates to a mobile terminal device that reproduces a television broadcast, and particularly to a mobile terminal device that reproduces a television broadcast program for which a viewing reservation was made, a control method thereof, a program, and an integrated circuit device.

BACKGROUND ART

In regard to mobile terminal devices such as mobile phones and personal digital assistants, recent years have seen the developments in size reduction and multi-functionalization of the devices. Among such devices, there are models coming along that can receive and display a television broadcast. Moreover, there are mobile viewing devices coming along that allow viewing and recording of TV broadcasts at the same time.

Such a mobile viewing device simultaneously receives and records a terrestrial digital broadcast into a memory card. When a user, who has been viewing the broadcast in this state of things, has to stop viewing due to something else to do, the viewing device records mark information, which indicates the position at which the user stopped viewing, into the memory card (see Patent Reference 1, for example). In the case of this mobile viewing device, when the program reproduction is resumed later from the memory card, the program is reproduced from the position, from which onward the program has not been viewed, on the basis of the mark information. In this way, an attempt has been made to improve the operability.

Patent Reference 1: Japanese Application Publication No. 2003-101921.

DISCLOSURE OF INVENTION

Problems that Invention is to Solve

For the above mobile viewing device, however, the improvement has been made merely in the continuity of the program between before and after the interruption of the television viewing. Television-equipped mobile phones of today already have various kinds of modes for email creation, application program execution, and phone book function, in addition to the modes for making a voice call by telephone and a video call and for achieving data communications. Thus, it is desired to avoid a collision of these modes with display of a television program or with reserved viewing of a television program, and also desired to realize this avoidance by simple and easy operation.

An object of the present invention is to provide a television-equipped mobile terminal device which avoids a collision of reserved viewing of a television broadcast with a different operation mode and which realizes this avoidance by simple and easy operation, and to provide a control method thereof, a program, and an integrated circuit device.

Means to Solve the Problems

In order to solve the stated problem, a mobile terminal device of the present invention is composed of: a holding unit operable to hold a start time at which a television reproduction for a reserved viewing is to be started; a control unit operable to perform a control so that the television reproduction is started at the start time; and a determination unit operable to determine a current operation mode of the mobile terminal device, wherein the control unit is further operable to control the determined operation mode and the television reproduction for the reserved viewing.

With this structure, when the mobile terminal device is executing a different operation mode at a start time of reserved viewing, a control can be performed so as to continue both the different operation mode and the television reproduction, to temporarily stop one of them, or to have one of them operated in an alternative way, in accordance with the type of the operation mode. Accordingly, a collision of the reserved viewing of the television broadcast with the different operation mode can be avoided, and this avoidance can be realized by simple and easy operation.

Here, the control unit is further operable to notify a user a predetermined period of time prior to the start time that the television reproduction is to be started, when the operation mode is at least a standby mode.

Here, the notification may be provided by one of a vibration, a sound, and a light emission.

Here, the control unit may cause a display panel to display one of an indication that the television reproduction is to be started, a television program title, a channel number, and a channel name.

With this structure, even in the case where a different operation mode is being previously executed, the control unit further gives an advance notice of the start of the reserved reproduction, thereby allowing the user to terminate the mode through a user operation.

Here, the control unit may further cause the recording unit to record the television broadcast when a predetermined operation is received from the user in response to the notification.

Even in the case where a different operation mode is being previously executed, this structure allows the user to select the television recording instead of the television reproduction so that the currently active operation mode can be continued.

Here, the control unit may hold the predetermined period of time set by the user.

With this structure, the advance notice can be given to the user a predetermined period of time prior to the start time of the reserved television reproduction. The period may be 3 minutes, 60 seconds, or 30 seconds that is convenient for the user.

Here, when the operation mode is at least a power-off mode, the control unit may turn on a power to the mobile terminal device the predetermined period of time prior to the start time.

With this structure, the reserved television reproduction can be started even when the power is off at the start time.

Here, when the operation mode is an email creation mode, the control unit may temporarily save an email currently being created at the start time.

Here, when the operation mode is an email creation mode, the control unit may have an email in progress of creation and the television reproduction displayed at the start time respectively on: (a) two split areas obtained by splitting one display area into two; or (b) two separate display panels.

Here, when the operation mode is an email creation mode, the control unit may cause the recording unit to perform the recording instead of the television reproduction at the start time.

Here, after the email creation mode is terminated, the control unit may further notify the user that the recording is currently being performed by the recording unit.

Here, after the email creation mode is terminated, the control unit may further inquire of the user whether or not to reproduce the television broadcast recorded by the recording unit.

Here, when the operation mode at the start time is an email creation mode, the control unit may further perform a control in accordance with a selection made by the user from among: (a) temporarily saving an email that is currently being created at the start time; (b) displaying both the email currently being created and video by the television reproduction; and (c) causing the recording unit to perform the recording instead of the television reproduction.

Here, the control unit may inquire of the user at the start time which one the user is to select from among the above (a) to (c).

When the active operation mode at the start time is the email creation mode, this structure can realize continuing both of them, stopping the email creation mode, or replacing the television reproduction with the television recording, regardless of the presence or absence of a user operation. Moreover, by predetermining the user selection from among the above (a) to (c) or by setting a default, the operation can be realized at the start time without the user operation. Furthermore, by making an inquiry about the above user selection at the start time, a control appropriate to the situation, like a simple user operation such as a menu selection, can be performed.

Here, the mobile terminal device may be further composed of a data reproduction unit operable to reproduce data recorded by the recording unit, wherein when the operation mode is a reproduction mode by the data reproduction unit, the control unit is operable to stop the data reproduction unit so that the television reproduction is started.

Here, when the operation mode is a reproduction mode by the data reproduction unit, the control unit may have video by the television reproduction and video shown by the data reproduction unit displayed respectively on: (a) two split areas obtained by splitting one display area into two; or (b) two separate display panels.

Here, when the operation mode is a reproduction mode by the data reproduction unit, the control unit may cause the data reproduction unit to continue the data reproduction and cause the recording unit to perform the recording instead of the television reproduction.

Here, when the reproduction by the data reproduction unit is finished, the control unit may further notify the user that the television broadcast is currently being recorded by the recording unit.

Here, when the reproduction by the data reproduction unit is finished, the control unit may further notify the user that the television broadcast is currently being recorded by the recording unit.

Here, when the operation mode is a reproduction mode by the data reproduction unit, the control unit may inquire of the user which one to select from among: (a) stopping the data reproduction unit so that the television reproduction is started; (b) displaying both video by the television reproduction and video shown by the data reproduction unit; and (c) causing the data reproduction unit to continue the reproduction and causing the recording unit to perform the recording instead of the television reproduction.

When the active operation mode at the start time is the data reproduction mode, this structure can realize continuing both the television reproduction and the data reproduction, stopping the data reproduction mode, or canceling the television reproduction or replacing the television reproduction with the television recording, regardless of the presence or absence of a user operation. Moreover, by predetermining the user selection from among the above (a) to (c) or by setting a default, the operation can be realized at the start time without the user operation. Furthermore, by making an inquiry about the above user selection at the start time, a control appropriate to the situation, like a simple user operation such as a menu selection, can be performed.

Here, when the operation mode is a communication mode, the control unit may continue the communication mode and cause the recording unit to perform the recording instead of the television reproduction, at the start time, wherein the communication mode includes one of a voice call, a video call, and a data communication.

Here, after the communication mode is terminated, the control unit may further notify the user that the recording is currently being performed by the recording unit.

Here, after the communication mode is terminated, the control unit may further inquire of the user whether or not to reproduce the television broadcast recorded by the recording unit.

When the active operation mode at the start time is the communication mode, this structure can realize continuing both the television reproduction and the communication mode, continuing the communication mode, or canceling the television reproduction or replacing the television reproduction with the television recording, regardless of the presence or absence of a user operation. Moreover, by predetermining the user selection from among the above (a) to (c) or by setting a default, the operation can be realized at the start time without the user operation. Furthermore, by making an inquiry about the above user selection at the start time, a control appropriate to the situation, like a simple user operation such as a menu selection, can be performed.

Here, when the operation mode is a folded mode, the mode referring to a state where the mobile terminal device is folded, the control unit may cause the recording unit to perform the recording instead of the television reproduction, at the start time.

Here, when the recording unit is currently recording the television broadcast in the folded mode, the control unit may further cause a display, which is visible in the folded state, to show an indication accordingly.

Here, when the recording unit finishes the recording in the folded mode, the control unit may further notify the user accordingly. The notification may be provided by one of a vibration, a sound, a light emission, and a displayed indication.

Here, when the recording unit is currently performing the recording in the folded mode and then the folded mode is canceled, the control unit may further notify the user that the recording unit is currently performing the recording.

Here, when the recording unit is currently recording the television broadcast in the folded mode and then the folded mode is terminated, the control unit may further inquire of the user whether or not to reproduce the television broadcast recorded by the recording unit.

When the active operation mode at the start time is the folded mode, this structure can realize continuing both the television reproduction and the folded mode, stopping the folded mode, making a notification about the television reproduction or replacing the television reproduction with the television recording in the folded mode, regardless of the presence or absence of a user operation.

Here, when the recording unit is currently recording the television broadcast and the user performs an operation to turn off the power, the control unit may further alert the user.

This structure can prevent the case where the user does not notice that the television recording was executed instead of the reserved television reproduction.

Here, when a predetermined stop condition is satisfied, the control unit may cause the recording unit to stop the recording.

Here, the mobile terminal device may be further composed of a detection unit operable to detect an end time of the program, which is currently being recorded by the recording unit, on the basis of broadcasted electronic program guide information, wherein the stop condition is the end time detected by the detection unit.

Here, the stop condition may be a user operation performed to stop the recording.

With this structure, even when the user does not notice that the television recording is being executed instead of the reserved television reproduction, the television recording can be appropriately completed. Moreover, when the stop condition is the end time of the program, this structure can prevent the case where entire free space of a recording medium or memory becomes zero due to the television recording.

In addition, a control method, a program, and an integrated circuit device relating to the mobile terminal device of the present invention respectively have the same structure as described above and have the same effects.

EFFECTS OF THE INVENTION

According to the mobile terminal device, the control method thereof, the program, and the integrated circuit device of the present invention, when the mobile terminal device is executing a different operation mode at the start time of reserved viewing, a control can be performed so as to continue both the different operation mode and the television reproduction, to temporarily stop one of them, or to have one of them operated in an alternative way, in accordance with the type of the operation mode. Accordingly, a collision of the reserved viewing of the television broadcast with the different operation mode can be avoided, and this avoidance can be realized by simple and easy operation.

Moreover, when a different operation mode is being previously executed, the structure allows the user to select the television recording instead of the television reproduction through a user operation so that the active operation mode can be continued.

For the control over the different operation mode and the television reproduction, the user selection from among continuing both of them, stopping one of them, or having one of them in an alternative way may be determined in advance, or a default may be set. Consequently, the control can be performed at the start time without a user operation. Furthermore, by making an inquiry about the above user selection at the start time, a control appropriate to the situation, like a simple user operation such as a menu selection, can be performed.

BRIEF DESCRIPTION OF DRAWINGS

FIG. 2 is a diagram illustrating a screen splitting.

FIG. 3A is an external view showing an example of the mobile terminal which has two screens.

FIG. 3B is an external view showing an example of the mobile terminal which has two screens.

FIG. 5 is a diagram showing an example of a set value table.

FIG. 6A is an illustration showing a specific example of a first set value.

FIG. 6B is an illustration showing a specific example of a second set value.

FIG. 6C is an illustration showing a specific example of a third set value.

FIG. 6D is an illustration showing a specific example of a fourth set value.

FIG. 6E is an illustration showing a specific example of a fifth set value.

NUMERICAL REFERENCES

Figure 1:
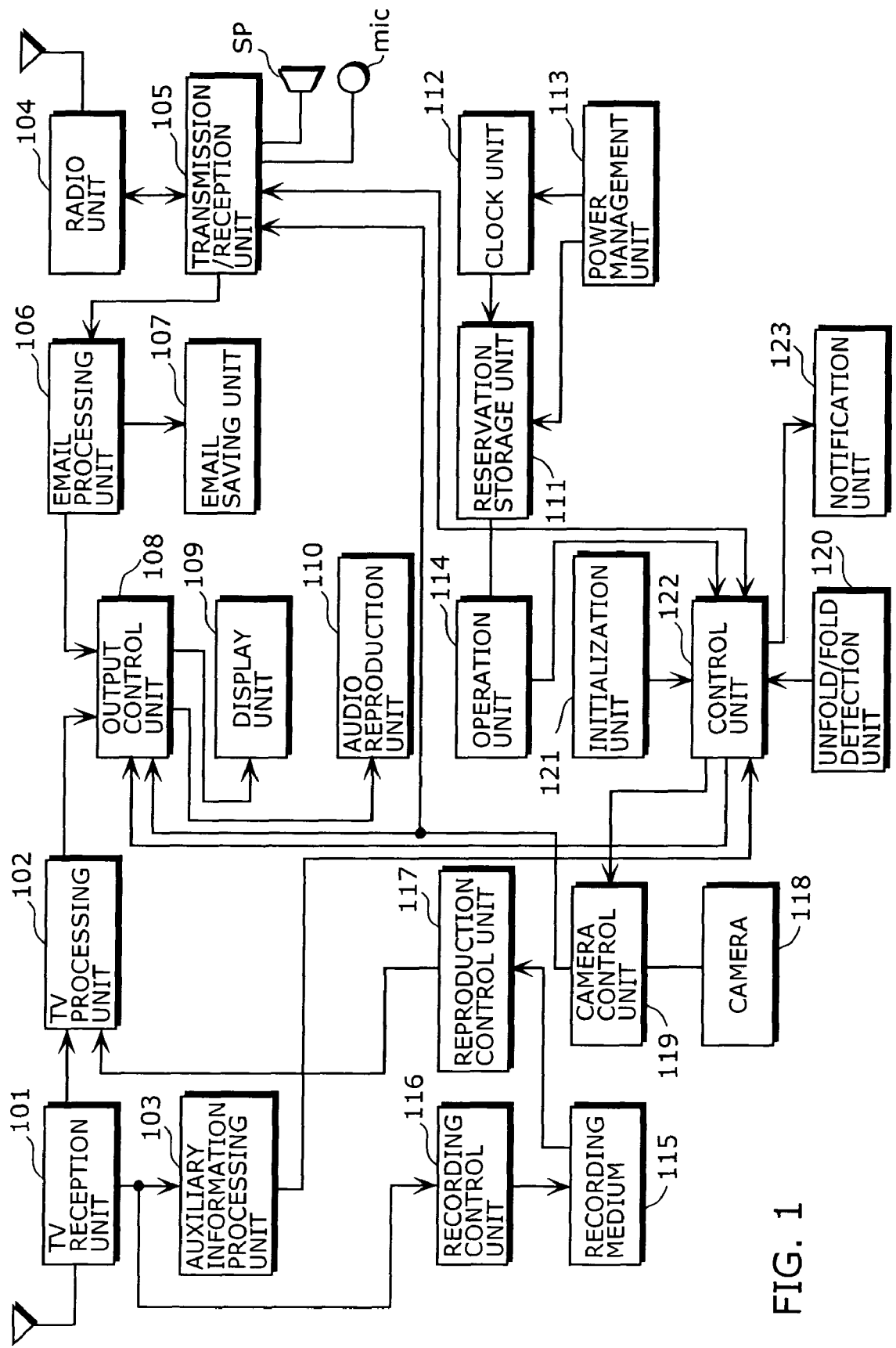
FIG. 1 is a block diagram showing a structure of a mobile terminal of an embodiment of the present invention.

101 TV reception unit
102 TV processing unit
103 auxiliary information processing unit
104 radio unit
105 transmission/reception unit
106 email processing unit
107 email saving unit
108 output control unit
109 display unit
110 audio reproduction unit
111 reservation storage unit
112 clock unit
113 power management unit
114 operation unit
115 recording medium
116 recording control unit
117 reproduction control unit
118 camera
119 camera control unit
120 unfold/fold detection unit
121 initialization unit
122 control unit
123 notification unit

BEST MODE FOR CARRYING OUT THE INVENTION

FIG. 1 is a block diagram showing a structure of a mobile terminal of an embodiment of the present invention. As shown in this diagram, the mobile terminal device is composed of a TV reception unit 101, a TV processing unit 102, an auxiliary information processing unit 103, a radio unit 104, a transmission/reception processing unit 105, an email processing unit 106, an email saving unit 107, an output control unit 108, a display unit 109, an audio reproduction unit 110, a reservation storage unit 111, a clock unit 112, a power management unit 113, an operation unit 114, a recording medium 115, a recording control unit 116, a reproduction control unit 117, a camera 118, a camera control unit 119, an unfold/fold detection unit 120, an initialization unit 121, a control unit 122, and a notification unit 123. The mobile terminal device is so structured as to control an operation mode and the television reproduction at the start time of reserved viewing of a television broadcast and to perform an operation to continue both of them or an operation desired by the user.

The TV reception unit 101 is a television tuner, for example, that corresponds to one-segment service of terrestrial digital broadcasting in Japan and receives one segment of a transport stream (referred to as a "TS" hereafter). A band of one channel of a terrestrial digital television broadcast is divided into thirteen segments, out of which twelve segments are assigned to service for a home television receiver whereas one segment is assigned to service for the mobile terminal device. One-segment service refers to service that broadcasts contents for the mobile terminal using one segment, the details of the contents being the same as those broadcasted using the other twelve segments. Similar service will be implemented in South Korea, Europe, and so forth.

The TV processing unit 102 is a TS decoder and MPEG decoder, and decodes a TS of one segment received by the TV reception unit 101 or a TS of one segment read out by the reproduction control unit 117 from the recording medium 115.

The auxiliary information processing unit 103 receives data in the form of sections out of the TS. The data in the form of sections includes an electronic program guide (EPG: electronic program guide). The electronic program guide has a program listing that includes channel numbers, channel names, program titles, program start times, program end times, and names of the cast.

The radio unit 104 and the transmission/reception unit 105 conduct voice calls, video calls, and data communications.

The email processing unit 106 performs processing for creating and displaying an electronic mail.

The email saving unit 107 saves the email created by the email processing unit 106 and an email received by the transmission/reception unit 105.

The output control unit 108 performs a control to output video data and audio data outputted from the TV processing unit 102, to the display unit 109 and the audio reproduction unit 110. When doing so, the output control unit 108 controls the display unit 109, causing the display unit 109 to execute a split screen display or a double screen display, according to an instruction from the control unit 122. By the split screen display, different contents are respectively displayed on two split areas of one display panel. By the double screen display, different contents are respectively displayed on two display panels. FIG. 2 is an illustration showing the split screen display. On the left side of this diagram, a display area d1 used for email creation is shown on the display panel. On the right side of this diagram, a split area d2 used for email creation and a split area d3 used for television display are shown.

Figure 4A:
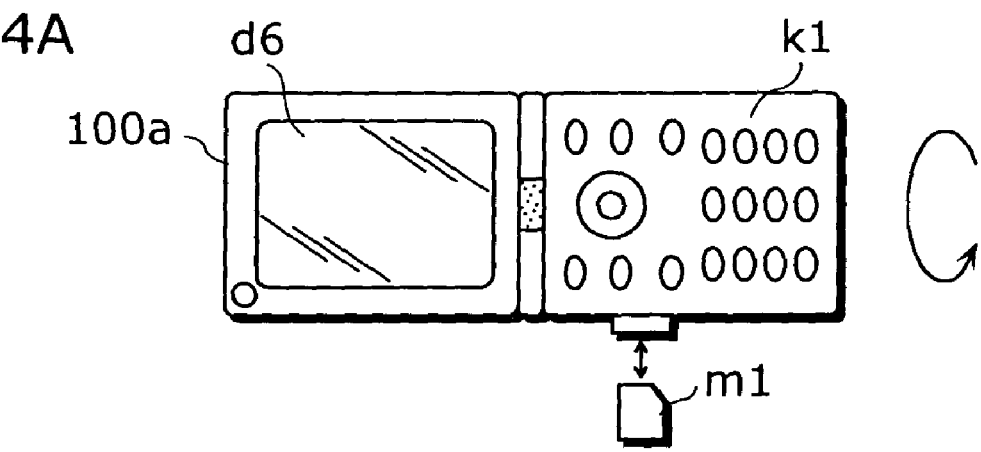
FIG. 4A is an external view showing another example of the mobile terminal which has two screens.
Figure 4B:
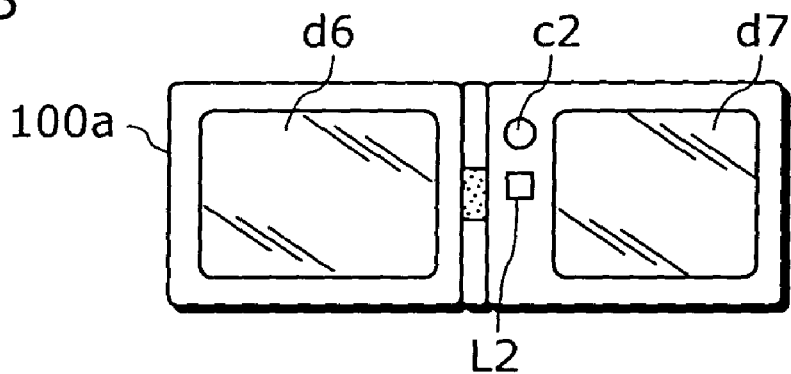
FIG. 4B is an external view showing another example of the mobile terminal which has two screens.

The display unit 109 has two liquid crystal display panels. FIG. 3A and FIG. 3B show an example of the mobile terminal device which has two liquid crystal panels. FIG. 3A and FIG. 3B respectively show the front and back of a fold-type mobile terminal device 100 in an unfolded state. The mobile terminal device 100 has: a main display d4 and an operation key unit on the front; a sub-display d5, a camera c1, and a light emitting unit L1 on the back; and a memory card slot on the side, into which a recording medium ml is to be placed. FIG. 4A and FIG. 4B show another example of the mobile terminal device which has two liquid crystal panels. FIG. 4A shows the front of a fold-type mobile terminal device 100a in an unfolded state, the device 100a having a rotating hinge. FIG. 4B shows a state where an operation key unit has been rotated. The mobile terminal device 100a is composed of a first display d6, a second display d7, an operation key unit k1, a camera c2, a light emitting unit L2, and a memory card slot. Note that each of the light emitting units L1 and L2 is a light emitting diode (LED: light emitting diode) or a flashlight.

The audio reproduction unit 110 has a speaker that is equipped separately from a speaker for voice calls and is used for outputting a sound of television broadcasting, voice of a video call, and various kinds of notifications and alarms.

The reservation storage unit 111 stores a start time at which the television reproduction as reserved viewing is to be started and also stores a value of a predetermined period of time for giving an advance notice, in accordance with a user operation performed using the operation unit 114. The predetermined period of time may be 60 seconds or 30 seconds, for example, and is used for giving the advance notice of the start of the television reproduction a predetermined period of time $\Delta t$ prior to the start time (referred to as the "advance-notice time" hereafter).

The clock unit 112 outputs a current time of day.

The power management unit 113 supplies power to 112, the reservation storage unit 111, the unfold/fold detection unit 120, and the control unit 122 while the power is off. Owing to this supply, the control unit 122 can detect comings of the advance-notice time and the start time even when the power is off.

The operation unit 114 corresponds to the operation key unit shown in FIG. 3A or FIG. 4A.

The recording medium 115 is a semiconductor memory card placed in the memory card slot. It should be noted that the recording medium 115 does not have to be a semiconductor memory card, and may be a removable hard disc or a recordable optical disc.

The recording control unit 116 records a television broadcast program, or more specifically, records the TS received by the TV reception unit 101 onto the recording medium 115. In place of the recording medium 115, this recording control unit 116 records the program selectively onto the removable hard disc, the recordable optical disc, or a main memory fixed in the mobile terminal device. In the present embodiment, an explanation is given as to a case where the recording control unit 116 records the program onto the recording medium 115, as a representative example.

The reproduction control unit 117 reproduces the program recorded on the recording medium 115, or more specifically, reads the TS from the recording medium 115 and outputs the TS to the TV processing unit 102.

The camera 118 includes an image sensor and takes still pictures and moving pictures.

The camera control unit 119 controls the imaging performed by the camera 118, and stores the imaged still picture data and moving picture data onto the recording medium 115 after performing data compression or outputs the data as moving picture data for a video call to the transmission/reception processing unit 105.

The unfold/fold detection unit 120 detects whether the mobile terminal device is in a folded state or an unfolded state. It should be noted that when the mobile terminal device is not a fold type but a slide type or the like, the unfold/fold detection unit 120 also detects whether or not: it is in the folded state; a display screen is hidden; or the user cannot see the display screen. The folded state, the state where the display screen is closed, the state where the display screen is hidden, and the state where the user cannot see the display screen are collectively referred to as an invisible mode. As a representative example of the invisible mode, a folded mode is explained below.

For a case where the mobile terminal device is in the operation mode of creating an email or making a call at the start time of the reserved viewing of a television broadcast, the initialization unit 121 holds a set value table that includes various kinds of set values used for controlling the current operation mode and the television reproduction. The set value table holds a factory default value for each of the various kinds of set values, and can be freely changed through a user operation performed using the operation unit 114.

FIG. 5 shows an example of the set value table. In this diagram, the set value table has first to fifth set values. The first set value relates to a control performed when the mobile terminal device is in the email creation mode at the start time. The second set value relates to a control performed when the mobile terminal device is in the reproduction mode at the start time, in which the data of moving pictures or still pictures recorded on the recording medium 115 is reproduced or displayed. The third set value relates to a control performed when the mobile terminal device is in a communication mode at the start time, and is made up of first to third parameters. Here, the communication mode is a collective term for a voice call mode, a video call mode, and a data communication mode of web browsing and the like. The first parameter relates to a control performed when the mobile terminal device is in the voice call mode at the start time. The second parameter relates to a control performed when the mobile terminal device is in the video call mode at the start time. The third parameter relates to a control performed when the mobile terminal device is in the data communication mode at the start time. The fourth set value relates to a control performed when the mobile terminal device is in the folded mode at the start time, in which the device is in a state of being folded. The fifth set value relates to a control performed when the mobile terminal device is in a standby mode at the start time, in which the device is on standby only for receiving an incoming call. It should be noted that each default value of the first to fifth set values is "1".

FIG. 6A is an illustration showing a specific example of the first set value. In this diagram, a value "1" as the first set value represents that an email in progress of creation in the email creation mode is temporarily saved in the email saving unit 107 and video display by the television reproduction (abbreviated as the "television display" hereafter) is started, at the start time. A value "2" as the first set value represents that with the screen splitting, an email in progress of creation is shown on one split area and the television display is shown on the other split area, at the start time. A value "3" as the first set value represents that with the double screen display, an email in progress of creation is shown on one of the two displays and the television display is shown on the other display of the two, at the start time. A value "4" as the first set value represents that an email in progress of creation continues to be displayed and the television recording is started instead of the television display, at the start time. A value "5" as the first set value represents that the user is inquired at the start time which one to select from among the operations represented by the above "1" to "4" shown as the first set value.

FIG. 6B is an illustration showing a specific example of the second set value. In this diagram, a value "1" as the second set value represents that the data reproduction from the recording medium 115 is stopped and the television display is started, at the start time. A value "2" as the second set value represents that the data reproduction or display from the recording medium 115 is continued and the television recording is started instead of the television display, at the start time. A value "3" as the second set value represents that with the screen splitting, the data reproduction or display from the recording medium 115 is shown on one split area and the television display is shown on the other split area, at the start time. A value "4" as the second set value represents that with the double screen display, the data reproduction or display from the recording medium 115 is shown on one of the two displays and the television display is shown on the other display of the two, at the start time. A value "5" as the second set value represents that the user is inquired at the start time which one to select from among the operations represented by the above "1" to "4" shown as the second set value.

FIG. 6C is an illustration showing specific examples of the first to third parameters included in the third set value. A value "1" as the first parameter in this diagram represents that a voice call is continued and the television recording is started instead of the television display, at the start time. A value "2" as the first parameter represents that a voice call is continued and the television display is started, at the start time. A value "3" as the first parameter represents that a voice call is continued and the television display is cancelled, at the start time. A value "4" as the first parameter represents that the user is inquired at the start time which one to select from among the operations represented by the above "1" to "4" shown as the first parameter.

A value "1" as the second parameter represents that a video call is continued and the television recording is started instead of the television display, at the start time. A value "2" as the second parameter represents that with the screen splitting, display for a video call is shown on one split area and the television display is shown on the other split area, at the start time. A value "3" as the second parameter represents that with the double screen display, display for a video call is shown on one of the two displays and the television display is shown on the other display, at the start time. A value "4" as the second parameter represents that a video call is continued and the television display is canceled, at the start time. A value "5" as the second parameter represents that the user is inquired at the start time which one to select from among the operations represented by the above "1" to "4" shown as the second parameter.

A value "1" as the third parameter represents that the data communication is continued and the television recording is started instead of the television display, at the start time. A value "2" as the third parameter represents that with the screen splitting, the details of the data communication are shown on one split area and the television display is shown on the other split area, at the start time. A value "3" as the third parameter represents that with the double screen display, the details of the data communication are shown on one of the two displays and the television display is shown on the other display, at the start time. A value "4" as the third parameter represents that the data communication is continued and the television display is canceled, at the start time. A value "5" as the third parameter represents that the data communication is disconnected and the television display is started, at the start time. A value "6" as the third parameter represents that the user is inquired which one to select from among the operations represented by the above "1" to "5" shown as the third parameter.

FIG. 6D is an illustration showing a specific example of the fourth set value. In this diagram, a value "1" as the fourth set value represents that the television recording is started instead of the television display and a notification about this is made by a sub display or the light emitting unit, at the start time. A value "2" as the fourth set value represents that at the start time, the television display is started on a main display in the standby state where a backlight is turned off and a sound of television broadcasting is outputted, then a notification about this is made by the sub display, the speaker, or the light emitting unit. A value "3" as the fourth set value represents that the television display is shown on the sub display and a notification about this is made by the speaker or the light emitting unit, at the start time. A value "4" as the fourth set value represents that the user is inquired on the sub display at the start time which one to select from among the operations represented by the above "1" to "3" shown as the fourth set value.

FIG. 6E is an illustration showing a specific example of the fifth set value. In this diagram, a value "1" as the fifth set value represents that the television display is started and a notification about this is made by the speaker, the sub display, or the light emitting unit, at the start time. A value "2" as the fifth set value represents that the television display is started and a notification about this is not made, at the start time.

The control unit 122 detects a coming of the advance-notice time, gives the advance notice of the television display for the reserved viewing at the advance-notice time, detects a coming of the start time of the reserved viewing, determines the operation mode of the mobile terminal device at the start time, and controls the determined operation mode and the television display for the reserved viewing in accordance with the various set values in the set value table held by the initialization unit 121.

The notification unit 123 gives the advance notice and makes a notification using the speaker and the light emitting unit of the audio reproduction unit 110 and the display of the display unit 109.

Figure 7:
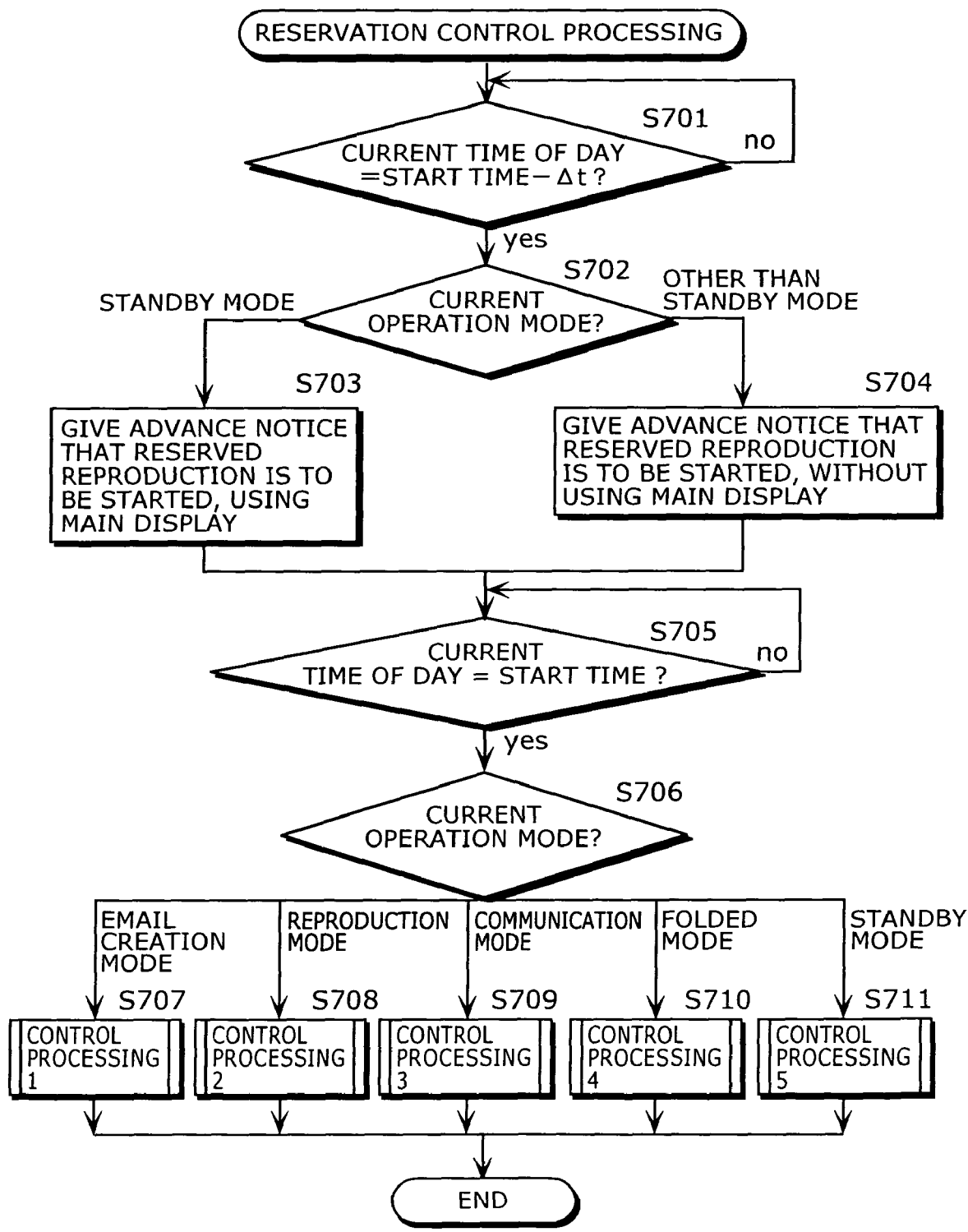
FIG. 7 is a flowchart showing control processing relating to a viewing reservation.

FIG. 7 is a flowchart showing control processing relating to the viewing reservation performed by the control unit 122. As shown in this diagram, the control unit 122 judges, on the basis of the start time and the predetermined period of time Δt stored in the reservation storage unit 111, whether or not the current time of day measured by the clock unit 112 is the advance-notice time (start time−Δt) (S701). When judging that it is the advance-notice time, the control unit 122 judges whether the current operation mode is not the folded mode but it is the standby mode (S702). When judging that it is not the folded mode but it is the standby mode, the control unit 122 gives the advance notice using the main display that the reserved reproduction is to be started (S703). As examples of making this advance notice: a message saying "The reserved television display will start in 60 seconds" is displayed on the main display; a beeping sound, a melody, or a voice message saying "The reserved television display will start in 60 seconds" is outputted from the speaker; or the light emitting unit lights up or blinks.

When judging that the current mode is other than the standby mode, the control unit 122 causes the display unit 109 to give the advance notice that the reserved reproduction will start, without using the main display (S703). As examples of making this advance notice: a message saying "The reserved television display will start in 60 seconds" is displayed on the sub display; a beeping sound, a melody, or a voice message saying "The reserved television display will start in 60 seconds" is outputted from the speaker; or the light emitting unit lights up or blinks.

Moreover, the control unit 122 judges whether or not the start time stored in the reservation storage unit 111 coincides with the current time of day measured by the clock unit 112 (S705). When judging it is the start time, the control unit 122 determines the current operation mode (S706). When the determined operation mode is the email creation mode, the control unit 122 performs control processing 1 (S707). When the determined operation mode is the reproduction mode in which the reproduction from the recording medium 115 is performed, the control unit 122 performs control processing 2 (S708). When the determined operation mode is the communication mode, the control unit 122 performs control processing 3 (S709). When the determined operation mode is the folded mode, the control unit 122 performs control processing 4 (S710). When the determined operation mode is the standby mode, the control unit 122 performs control processing 5 (S711).

Figure 8:
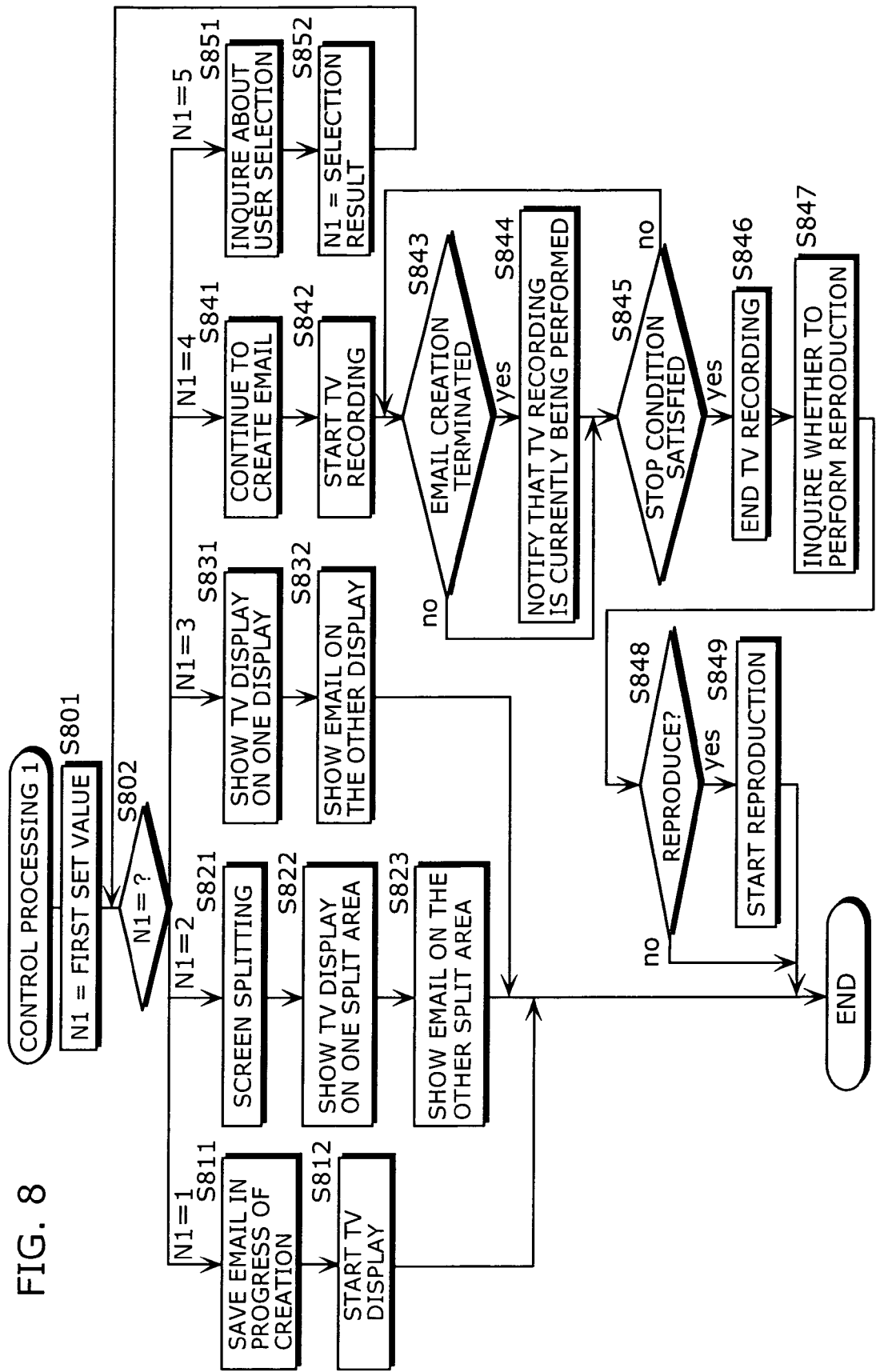
FIG. 8 is a flowchart showing details of control processing 1.

FIG. 8 is a flowchart showing the details of the control processing 1. As shown in this diagram, when the mobile terminal device is in the email creation mode at the start time of the reserved viewing, the control unit 122 reads out the first set value from the set value table stored in the initialization unit 121 and assigns the value to a variable N1 (S801). Then, the control unit 122 determines a value of the variable N1 (S802).

When N1=1, the control unit 122 controls the email processing unit 106, causing the email processing unit 106 to temporarily save the email in progress of creation in the email creation mode into the email saving unit 107 (S811). Also, the control unit 122 controls the TV reception unit 101, the TV processing unit 102, and the output control unit 108 so that the television display is started (S812). As a result, the email processing unit 106 temporarily ends the email creation processing, so that the email creation mode is suspended. The output control unit 108 causes the display unit 109 to display the television broadcast program on the main display as well as causing the audio reproduction unit 110 to output a sound of television broadcasting from the speaker. Moreover, the control unit 122 may instruct the notification unit 123 to notify the user at the end of the television display that the email in progress of creation was temporarily saved.

When N1=2, the control unit 122 instructs the output control unit 108 to execute the display with the screen splitting. To be more specific, the control unit 122 instructs the output control unit 108 to carry out the screen splitting (S821), so that the email in progress of creation is shown on one split area (S822) and the television display is shown on the other split area (S823). For example, the television display is shown on an upper split area whereas the email is shown on a lower split area. Consequently, the user can create the email and watch the reserved television program at the same time. It should be noted that the correlation between the television display and the email display and the two display areas may be reversed. Also, the initialization unit 121 may further store a sub parameter of the first set value for the case where the value is 2, so that the above correlation can be determined in accordance with a value of the sub parameter.

When N1=3, the control unit 122 orders the double screen display. To be more specific, the control unit 122 causes the email processing unit 106 to display the email in progress of creation on the sub display (S831) and to display the television broadcast program on the main display (S832). Consequently, the user can create the email and watch the reserved television program at the same time. It should be noted that the correlation between the television display and the email display and the two displays may be reversed. Also, the initialization unit 121 may further store a sub parameter for the case where the first set value N1 is 3, so that the above correlation can be determined in accordance with a value of the sub parameter.

When N1=4, the control unit 122 causes the email processing unit 106 to continue the email creation mode (S841) and controls the TV reception unit 110 and the recording control unit 116 so that the television recording is started instead of the television display (S842). Thus, the television recording is started and the user can continue to create the email. Moreover, the control unit 122 judges whether or not the email creation mode has been terminated (S843). When judging that the email creation mode has been terminated, the control unit 122 controls the notification unit 123, causing the notification unit 123 to make a notification that the television recording is currently being performed (S844). For example, the notification unit 123 causes: the display unit 109 to show a message saying "The reserved television broadcast program is currently being recorded" or "The reserved television broadcast program "program title" is currently being recorded" on the main display or the sub display; the speaker to output a beeping sound, a melody, or a voice message saying "The reserved television broadcast program is currently being recorded"; or the light emitting unit to light up or blink. The above-mentioned "program title" is extracted by the control unit 122 from the electronic program guide received by the auxiliary information processing unit 103. On the other hand, when judging that the email creation mode has not been terminated, the control unit 122 judges whether or not a stop condition of the television recording is satisfied (S845). This stop condition is an end time of the television broadcast program which is currently being recorded, for example. This end time is extracted by the control unit 122 from the electronic program guide received by the auxiliary information processing unit 103. In addition, the stop condition includes a user operation explicitly performed in order to end the television recording. When judging that the stop condition is satisfied, the control unit 122 controls the TV reception unit 101 and the recording control unit 116 so that the television recording is ended (S846) and instructs the notification unit 123 to inquire of the user whether or not to reproduce the recorded television program (S847). Following this instruction, the notification unit 123 causes the display unit 109 to display an inquiry message saying "The recording of the reserved television broadcast program "program title" is completed. Would you like to reproduce it?" The control unit 122 judges whether an answer made through the user operation performed in response to the inquiry is "Reproduce" or "Not reproduce" (S848). When judging it is "Reproduce", the reproduction of the recorded television broadcast program is started (S849).

When N1=5, the control unit 122 instructs the notification unit 123 to inquire of the user which one to select from among the operations represented by the above "1" to "4" shown as the first set value (S851). Following this instruction, the notification unit 123 causes the display unit 109 to display an inquiry menu as follows, for example: "It is time to start the reserved viewing. Select from among the operations 1 to 4."; "1—Save the email and start the television display"; "2—Continue to create the email using the screen splitting and start the television display"; "3—Continue to create the email using the double screen display and start the television display"; and "4—Continue to create the email and start the television recording". The control unit 122 assigns the number selected through the user operation performed in response to this inquiry to N1 (S852), and returns to S802. As a result, the control unit 122 performs the same operation as the corresponding one of the above cases where N1 is "1" to "4", according to the selection made by the user.

Figure 9:
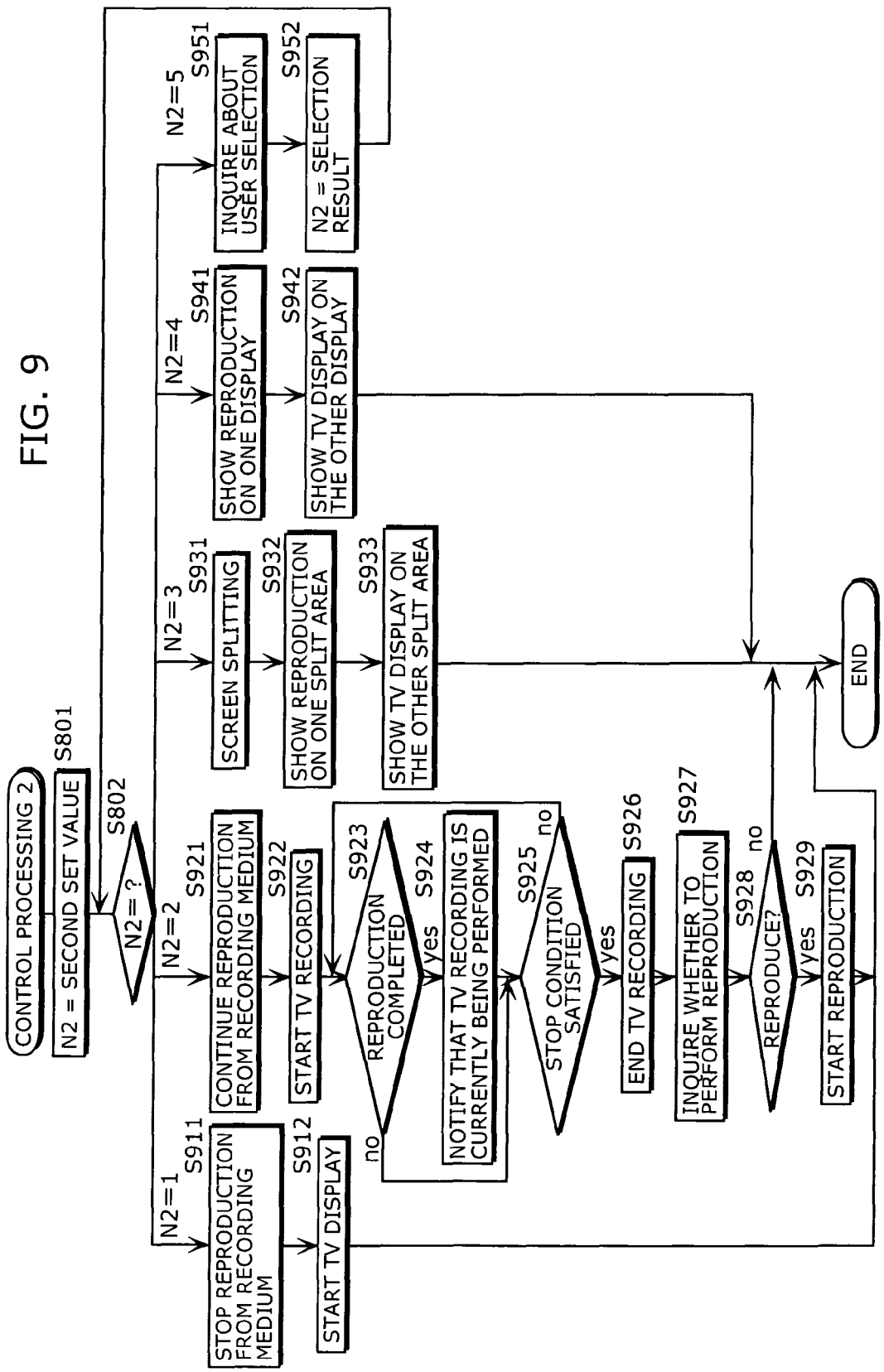
FIG. 9 is a flowchart showing details of control processing 2.

FIG. 9 is a flowchart showing the details of the control processing 2. As shown in this diagram, when the mobile terminal device is in the reproduction mode at the start time of the reserved viewing, the control unit 122 reads out the second set value from the set value table stored in the initialization unit 121 and assigns the value to a variable N2 (S901). Then, the control unit 122 determines a value of the variable N2 (S902).

When N2=1, the control unit 122 stops the data reproduction from the recording medium 115 that is performed by the reproduction control unit 117 and the TV processing unit 102 (S911). Then, the control unit 122 controls the TV reception unit 101, the TV processing unit 102, and the output control unit 108 so that the television display is started (S912).

When N2=2, the control unit 122 continues the data reproduction from the recording medium 115 that is performed by the reproduction control unit 117 and the TV processing unit 102 (S921). Then, the controls unit 122 controls the TV reception unit 101 and the recording control unit 116 so that the television recording is started instead of the television display (S922). As a result, the television recording is started and the user can watch the data reproduction from the recording medium 115. Moreover, the control unit 122 judges whether or not the data reproduction from the recording medium 115 is completed (S923). When judging that the data reproduction is completed, the control unit 122 controls the notification unit 123, causing the notification unit 123 to notify that the television recording is currently being performed (S924). The notification unit 123 makes the notification as in the case of S844 described above. When judging that the data reproduction is not completed, the control unit 122 judges whether or not the stop condition of the television recording is satisfied (S925). This stop condition is the same as the one used in S845 described above. When judging that the stop condition is satisfied, the control unit 122 controls the TV reception unit 101 and the recording control unit 116 so that the television recording is ended (S926) and instructs the notification unit 123 to inquire of the user whether or not to reproduce the recorded television program (S927). The notification made by the notification unit 123 following this instruction is the same as the one made in S847 described above. The control unit 122 judges whether an answer made through the user operation performed in response to the inquiry is "Reproduce" or "Not reproduce" (S928). When judging it is "Reproduce", the reproduction of the recorded television broadcast program is started (S929).

When N2=3, the control unit 122 instructs the output control unit 108 to execute the display with the screen splitting. To be more specific, the control unit 122 instructs the output control unit 108 to carry out the screen splitting (S931), so that video by the data reproduction is shown on one split area (S932) and the television display is shown on the other split area (S933). For example, the television display is shown on the upper split area whereas the video by the data reproduction is shown on the lower split area. At this time, the audio reproduction unit 110 may output both a sound of the data reproduction and a sound of the television broadcasting by mixture. Alternatively, the audio reproduction unit 110 may output one from the speaker and the other from an earphone. Consequently, the user can watch the display by the data reproduction simultaneously with the reserved television program. It should be noted that the correlation between the television display and the data reproduction display and the two display areas may be reversed. Also, the initialization unit 121 may further store a sub parameter of the second set value for the case where the value is 3, so that the correlation between the two split areas and the two displays and the correlation between the speaker and the earphone and the two audio outputs can be determined in accordance with a value of the sub parameter.

When N2=4, the control unit 122 orders the double screen display. To be more specific, the control unit 122 causes the sub display to show the video by the data reproduction (S941) and the main display to show the television broadcast program (S942). At this time, the audio reproduction unit 110 may output both the sound of the data reproduction and the sound of the television broadcasting by mixture. Alternatively, the audio reproduction unit 110 may output one from the speaker and the other from the earphone. Consequently, the user can watch the video by the data reproduction simultaneously with the reserved television program. It should be noted that the correlation between the television display and the video display by the data reproduction and the two displays may be reversed. Also, the initialization unit 121 may further store a sub parameter for the case where the second set value is 4 so that the correlation between the television display and the video display by the television display and the two displays and the correlation between the speaker and the earphone and the two audio outputs can be determined in accordance with a value of the sub parameter.

When N2=5, the control unit 122 instructs the notification unit 123 to inquire of the user which one to select from among the operations represented by the above "1" to "4" shown as the second set value (S951). Following this instruction, the notification unit 123 causes the display unit 109 to display an inquiry menu as follows, for example: "It is time to start the reserved viewing. Select from among the operations 1 to 4."; "1—Stop the data reproduction and start the television display"; "2—Continue the data reproduction and start the television recording"; "3—Continue the data reproduction using the screen splitting and start the television display"; and "4—Continue the data reproduction using the double screen display and start the television display". The control unit 122 assigns the number selected through the user operation performed in response to this inquiry to N2 (S952), and returns to S902. As a result, the control unit 122 performs the same operation as the corresponding one of the above cases where N2 is "1" to "4", according to the selection made by the user.

Figure 10A:
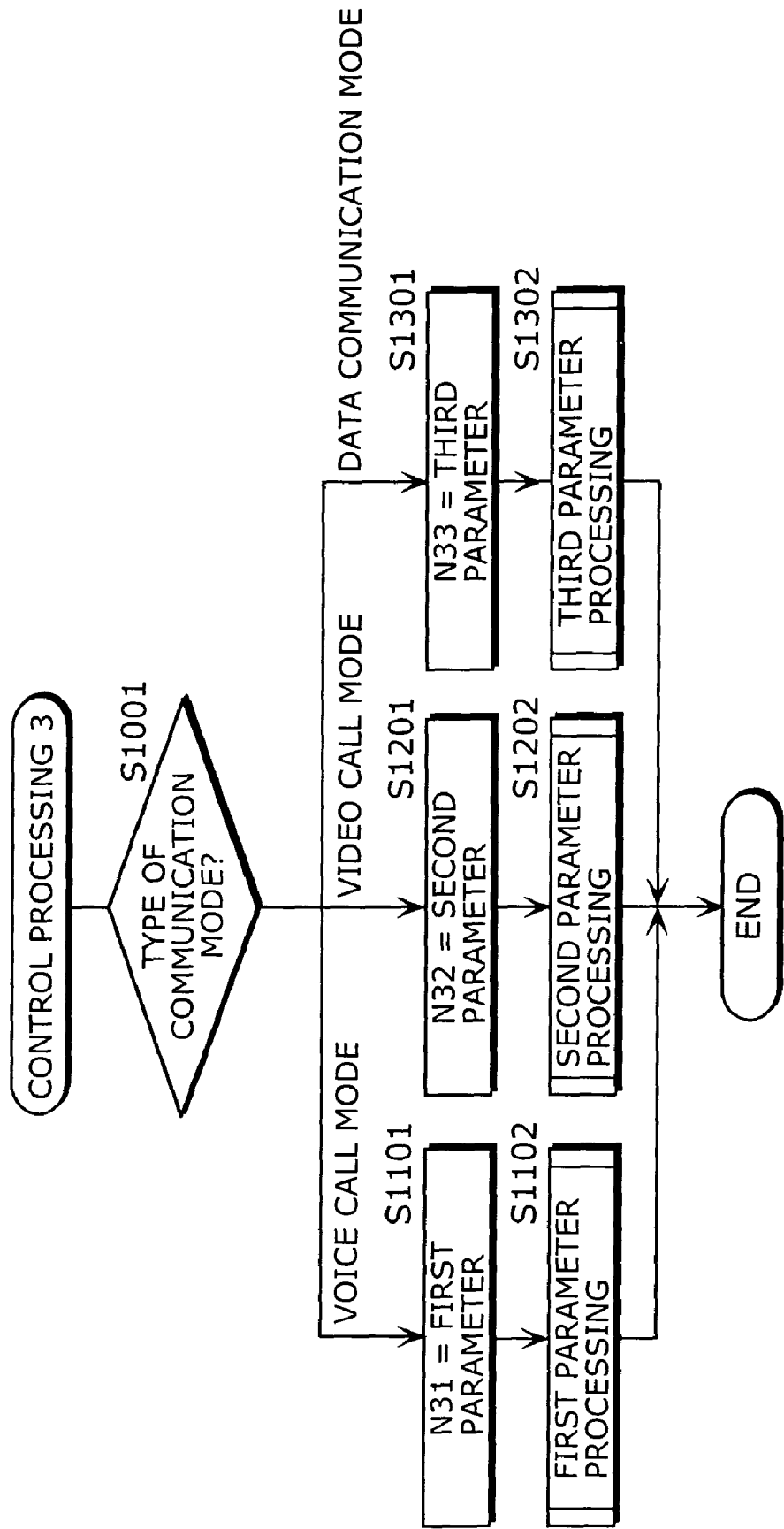
FIG. 10A is a flowchart showing details of control processing 3.

FIG. 10A is a flowchart showing the general outline of the control processing 3. As shown in this diagram, when the mobile terminal device is in the communication mode at the start time of the reserved viewing, the control unit 122 determines the type of the current communication mode (S1001). When determining that the communication mode is the voice call mode as a result, the control unit 122 reads out the first parameter of the third set value from the set value table stored in the initialization unit 121 and assigns the value to a variable N31 (S1101). Then, the control unit 122 performs first parameter processing (S1102). When the communication mode is the video call mode, the control unit 122 reads out the second parameter of the third set value from the set value table stored in the initialization unit 121 and assigns the value to a variable N32 (S1201). Then, the control unit 122 performs second parameter processing (S1202). Moreover, when the communication mode is the data communication mode, the control unit 122 reads out the third parameter of the third set value from the set value table stored in the initialization unit 121 and assigns the value to a variable N33 (S1301). Then, the control unit 122 performs third parameter processing (S1302).

Figure 10B:
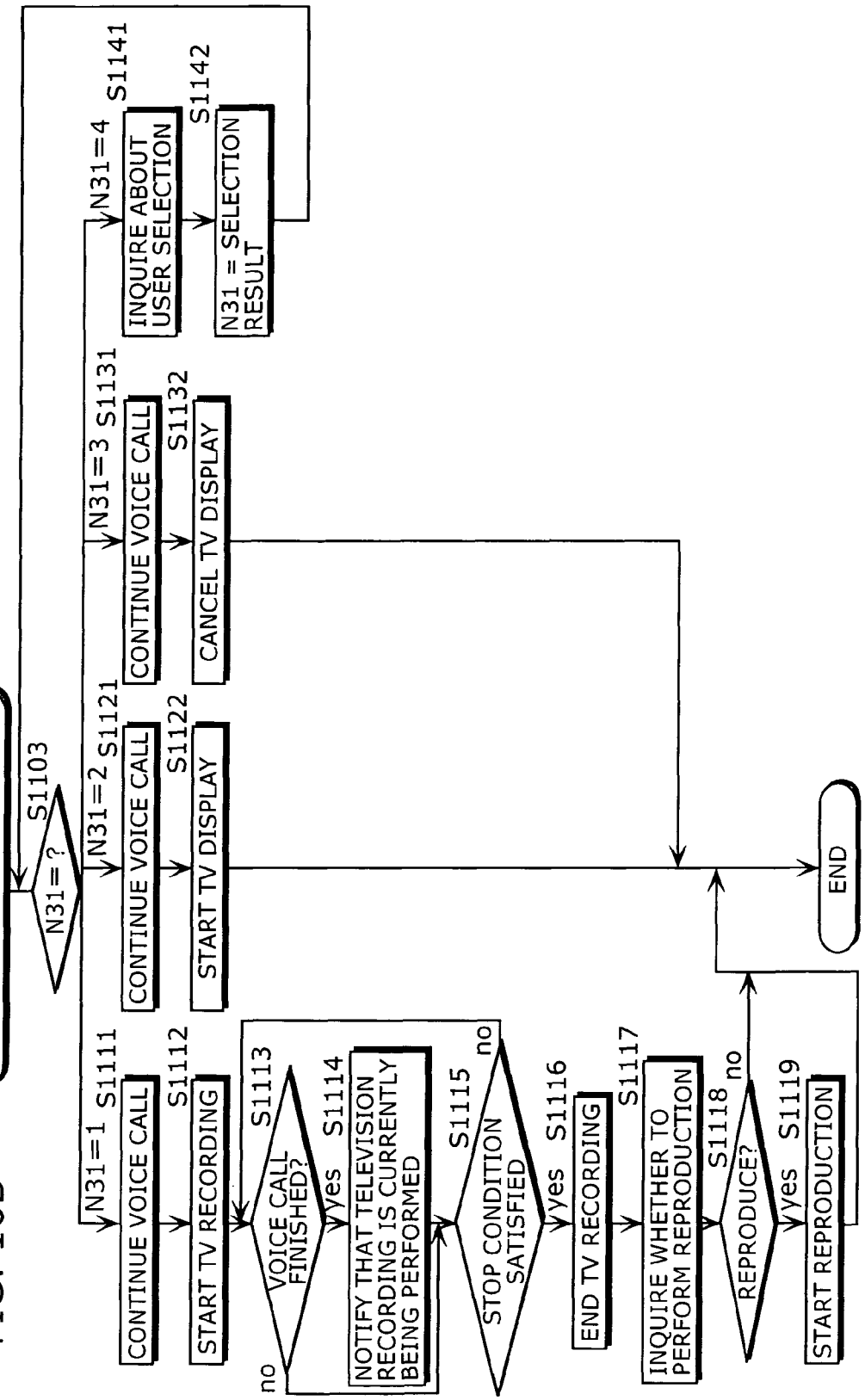
FIG. 10B is a flowchart showing details of the control processing 3 in a voice call mode.

FIG. 10B is a flowchart showing the details of the first parameter processing shown in FIG. 10A. As shown in this diagram, the control unit 122 determines a value of the variable N31 (S103) and performs the following processing in accordance with the determination result.

When N31=1, the control unit 122 continues the voice call conducted by the radio unit 104 and the transmission/reception unit 105 (S1111), and controls the TV reception unit 101 and the recording control unit 116 so that the television recording is started instead of the television display (S1112). Consequently, the television recording is started and the user can continue the voice call. Moreover, the control unit 122 judges whether or not the voice call is finished (S1113). When judging that the voice call is finished, the control unit 122 controls the notification unit 123, causing the notification unit 123 to notify that the television recording is currently being performed (S1114). Following this, the notification unit 123 makes the notification as in the case of S844 described above. When judging that the voice call is not finished, the control unit 122 judges whether or not the stop condition of the television recording is satisfied (S1115). This stop condition is the same as the one used in S845 described above. When judging that the stop condition is satisfied, the control unit 122 controls the TV reception unit 101 and the recording control unit 116 so that the television recording is ended (S1116) and instructs the notification unit 123 to inquire of the user whether or not to reproduce the recorded television program (S1117). The notification made by the notification unit 123 following this instruction is the same as the one made in S847 described above. The control unit 122 judges whether an answer made through the user operation performed in response to the inquiry is "Reproduce" or "Not reproduce" (S1118). When judging it is "Reproduce", the reproduction of the recorded television broadcast program is started (S1119).

When N31=2, the control unit 122 continues the voice call conducted by the radio unit 104 and the transmission/reception unit 105 (S1121) and causes the TV reception unit 101, the TV processing unit 102, and the output control unit 108 to start the television display (S1122). At this time, the audio reproduction unit 110 may reduce or mute the volume of an audio output of television broadcasting so that the voice call will not be disturbed. Accordingly, the user can continue the voice call and watch the television program at the same time.

When N31=3, the control unit 122 continues the voice call conducted by the radio unit 104 and the transmission/reception unit 105 (S1131), and cancels the television display (S1132). Thus, the user can concentrate attention on the voice call.

When N31=4, the control unit 122 instructs the notification unit 123 to inquire of the user which one to select from among the operations represented by the above "1" to "4" shown as the first parameter of the third set value (S1141). Following this instruction, the notification unit 123 causes the display unit 109 to display an inquiry menu as follows, for example: "It is time to start the reserved viewing. Select from among the operations 1 to 4."; "1—Continue the voice call and start the television recording"; "2—Continue the voice call and start the television display"; and "3—Continue the voice call and cancel the television display". The control unit 122 assigns the number selected through the user operation performed in response to this inquiry to N31 (S1142), and returns to S1103. As a result, the control unit 122 performs the same operation as the corresponding one of the above cases where N31 is "1" to "4", according to the selection made by the user.

Figure 10C:
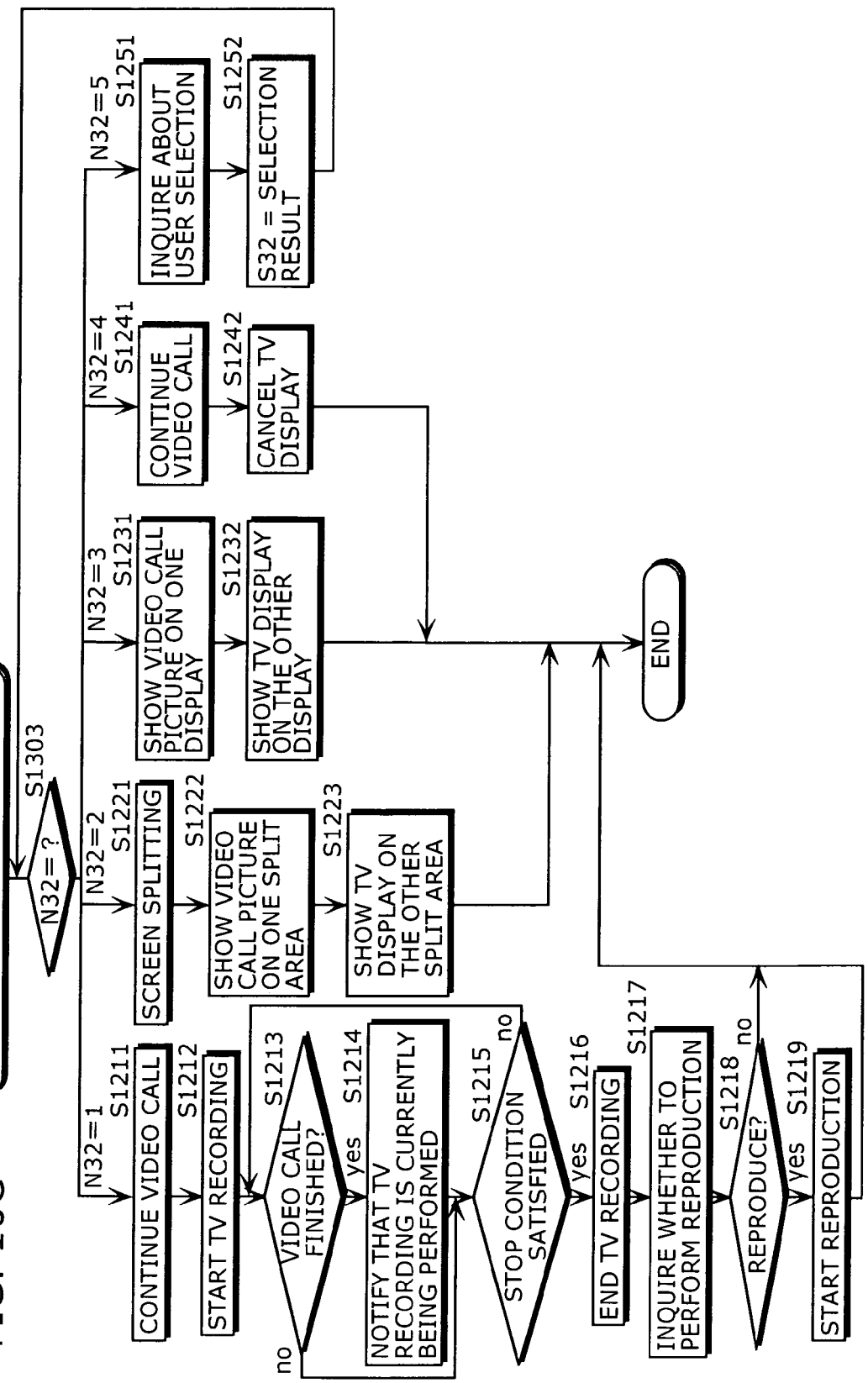
FIG. 10C is a flowchart showing details of the control processing 3 in a video call mode.

FIG. 10C is a flowchart showing the details of the second parameter processing shown in FIG. 10A. As shown in this diagram, the control unit 122 determines a value of the variable N32 (S1203) and performs the following processing in accordance with the determination result.

When N32=1, the control unit 122 continues the video call conducted by the radio unit 104 and the transmission/reception unit 105 (S1211), and controls the TV reception unit 101 and the recording control unit 116 so that the television recording is started instead of the television display (S1212). Consequently, the television recording is started and the user can continue the video call. Moreover, the control unit 122 judges whether or not the video call is finished (S1213). When judging that the video call is finished, the control unit 122 controls the notification unit 123, causing the notification unit to notify that the television recording is currently being performed (S1214). Following this, the notification unit 123 makes the notification as in the case of S844 described above. When judging that the video call is not finished, the control unit 122 judges whether or not the stop condition of the television recording is satisfied (S1215). This stop condition is the same as the one used in S845 described above. When judging that the stop condition is satisfied, the control unit 122 controls the TV reception unit 101 and the recording control unit 116 so that the television recording is ended (S1116) and instructs the notification unit 123 to inquire of the user whether or not to reproduce the recorded television program (S1217). The notification made by the notification unit 123 following this instruction is the same as the one made in S847 described above. The control unit 122 judges whether an answer made through the user operation performed in response to the inquiry is "Reproduce" or "Not reproduce" (S1218). When judging it is "Reproduce", the reproduction of the recorded television broadcast program is started (S1219).

When N32=2, the control unit 122 instructs the output control unit 108 to execute the display with the screen splitting. To be more specific, the control unit 122 instructs the output control unit 108 to carry out the screen splitting (S1221), so that the video by the video call is shown on one split area (S1222) and the television display is shown on the other split area (S1223). For example, the television display is shown on the upper split area whereas the video by the video call is shown on the lower split area. At this time, the audio reproduction unit 110 may output both a sound of the video call and a sound of the television broadcasting by mixture. Alternatively, the audio reproduction unit 110 may output one from the speaker and the other from the earphone. Thus, the user can watch the video by the video call and the reserved television program at the same time. It should be noted that the correlation between the television display and the video call display and the two display areas may be reversed. Also, the initialization unit 121 may further store a sub parameter of the second parameter for the case where the value is 2, so that the correlation between the two split areas and the two displays and the correlation between the speaker and the earphone and the two audio outputs can be determined in accordance with a value of the sub parameter.

When N32=3, the control unit 122 orders the double screen display. To be more specific, the control unit 122 has the video by the video call displayed on the main display (S1231) and has the television broadcast program displayed on the sub display (S1232). At this time, the audio reproduction unit 110 may output both the sound of the video call and the sound of the television broadcasting by mixture. Alternatively, the audio reproduction unit 110 may output one from the speaker and the other from the earphone. Consequently, the user can watch the video by the video call and the reserved television program at the same time. It should be noted that the correlation between the television display and the video by the video call and the two displays may be reversed. Also, the initialization unit 121 may further store a sub parameter of the second parameter for the case where the value is 3 so that the correlation between the television display and the video display by the data reproduction and the two displays, and the correlation between the speaker and the earphone and the two audio outputs can be determined in accordance with a value of the sub parameter.

When N32=4, the control unit 122 continues the video call conducted by the camera 118, the camera control unit 119, the radio unit 104, and the transmission/reception unit 105 (S1241), and cancels the television display (S1132). Consequently, the user can concentrate attention on the video call.

When N32=5, the control unit 122 instructs the notification unit 123 to inquire of the user which one to select from among the operations represented by the above "1" to "4" shown as the second parameter of the third set value (S1251). Following this instruction, the notification unit 123 causes the display unit 109 to display an inquiry menu as follows, for example: "It is time to start the reserved viewing. Select from among the operations 1 to 4."; "1—Continue the video call and start the television recording"; "2—Continue the video call using the screen splitting and start the television display"; "3—Continue the video call using the double display screen and start the television display"; and "4—Continue the video call and cancel the television display". The control unit 122 assigns the number selected through the user operation performed in response to this inquiry to N32 (S1252), and returns to S1203. As a result, the control unit 122 performs the same operation as the corresponding one of the above cases where N32 is "1" to "4", according to the selection made by the user.

Figure 10D:
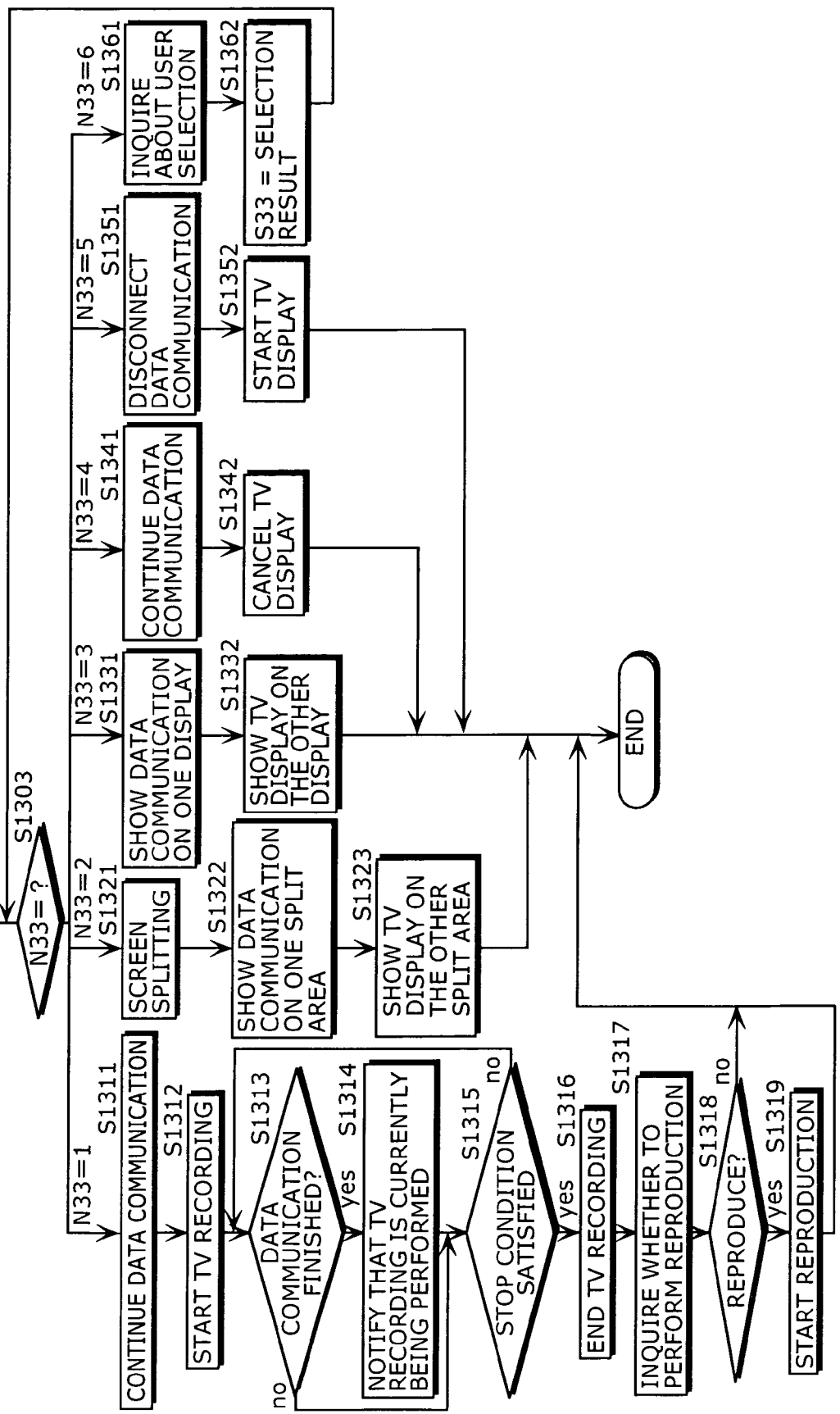
FIG. 10D is a flowchart showing details of the control processing 3 in a data communication mode.

FIG. 10D is a flowchart showing the details of the third parameter processing shown in FIG. 10A. As shown in this diagram, the control unit 122 determines a value of the variable N33 (S1303) and performs the following processing in accordance with the determination result.

When N33=1, the control unit 122 continues the data communication conducted by the radio unit 104 and the transmission/reception unit 105 (S1311), and controls the TV reception unit 101 and the recording control unit 116 so that the television recording is started instead of the television display (S1312). Consequently, the television recording is started and the user can continue the data communication (such as web browsing). Moreover, the control unit 122 judges whether or not the data communication is finished (S1313). When judging that the data communication is finished, the control unit 122 controls the notification unit 123, causing the notification unit 123 to notify that the television recording is currently being performed (S1314). Following this, the notification unit 123 makes the notification as in the case of S844 described above. When judging that the data communication is not finished, the control unit 122 judges whether or not the stop condition of the television recording is satisfied (S1315). This stop condition is the same as the one used in S845 described above. When judging that the stop condition is satisfied, the control unit 122 controls the TV reception unit 101 and the recording control unit 116 so that the television recording is ended (S1116) and instructs the notification unit 123 to inquire of the user whether or not to reproduce the recorded television program (S1317). The notification made by the notification unit 123 following this instruction is the same as the one made in S847 described above. The control unit 122 judges whether an answer made through the user operation performed in response to the inquiry is "Reproduce" or "Not reproduce" (S1318). When judging it is "Reproduce", the reproduction of the recorded television broadcast program is started (S1319).

When N33=2, the control unit 122 instructs the output control unit 108 to execute the display with the screen splitting. To be more specific, the control unit 122 instructs the output control unit 108 to carry out the screen splitting (S1321), so that the picture by the data communication is shown on one split area (S1322) and the television display is shown on the other split area (S1323). For example, the television display is shown on the upper split area whereas the picture by the data communication is shown on the lower split area. At this time, the audio reproduction unit 110 may output both a sound of the data communication and a sound of the television broadcasting by mixture. Alternatively, the audio reproduction unit 110 may output one from the speaker and the other from the earphone. Consequently, the user can watch the picture by the data communication and the reserved television program at the same time. It should be noted that the correlation between the television display and the data communication display and the two display areas may be reversed. Also, the initialization unit 121 may further store a sub parameter of the third parameter for the case where the value is 2, so that the correlation between the two split areas and the two displays and the correlation between the speaker and the earphone and the two audio outputs can be determined in accordance with a value of the sub parameter.

When N33=3, the control unit 122 orders the double screen display. To be more specific, the control unit 122 has the picture by the data communication displayed on the main display (S1331) and has the television broadcast program displayed on the sub display (S1332). At this time, the audio reproduction unit 110 may output both the sound of the data communication and the sound of the television broadcasting by mixture. Alternatively, the audio reproduction unit 110 may output one from the speaker and the other from the earphone. Consequently, the user can watch the picture by the data communication and the reserved television program at the same time. It should be noted that the correlation between the television display and the picture by the data communication and the two displays may be reversed. Also, the initialization unit 121 may further store a sub parameter of the third parameter for the case where the value is 3 so that the correlation between the television display and the video display by the data reproduction and the two displays, and the correlation between the speaker and the earphone and the two audio outputs can be determined in accordance with a value of the sub parameter.

When N33=4, the control unit 122 continues the data communication conducted by the radio unit 104 and the transmission/reception unit 105 (S1341), and cancels the television display (S1132). Consequently, the user can concentrate attention on the data communication.

When N33=5, the control unit 122 disconnects the data communication conducted by the radio unit 104 and the transmission/reception unit 105 (S1351), and has the television display started (S1352). Thus, the user can concentrate attention on watching television.

When N33=6, the control unit 122 instructs the notification unit 123 to inquire of the user which one to select from among the operations represented by the above "1" to "5" shown as the third parameter of the third set value (S1361). Following this instruction, the notification unit 123 causes the display unit 109 to display an inquiry menu as follows, for example: "It is time to start the reserved viewing. Select from among the operations 1 to 4."; "1—Continue the data communication and start the television recording"; "2—Continue the data communication using the screen splitting and start the television display"; "3—Continue the data communication using the double display screen and start the television display"; "4—Continue the data communication and cancel the television display"; and "5—Disconnect the data communication and start the television display". The control unit 122 assigns the number selected through the user operation performed in response to this inquiry to N33 (S1362), and returns to S1303. As a result, the control unit 122 performs the same operation as the corresponding one of the above cases where N33 is "1" to "5", according to the selection made by the user.

Figure 11:
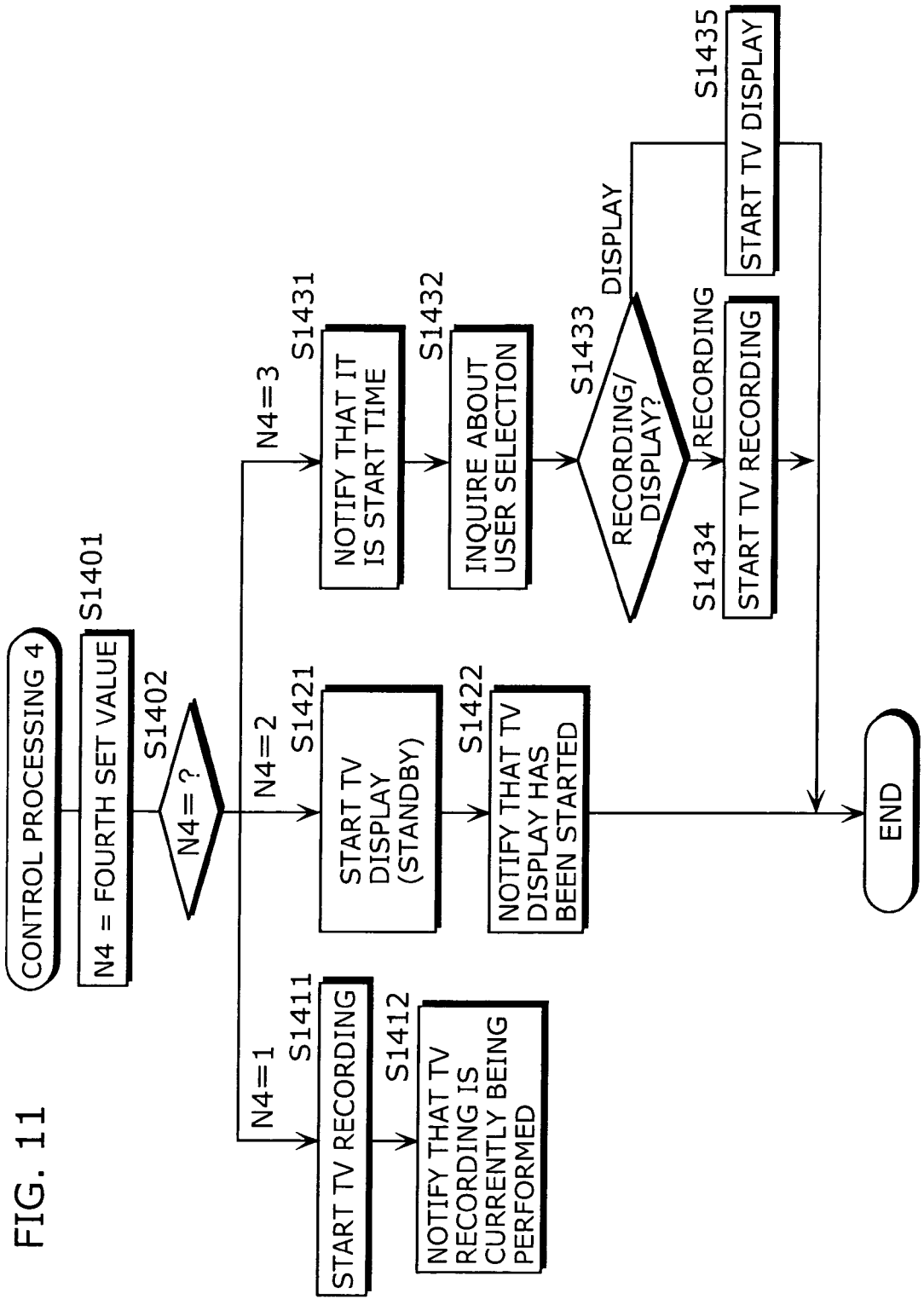
FIG. 11 is a flowchart showing details of control processing 4.

FIG. 11 is a flowchart showing the details of the control processing 4. As shown in this diagram, when the mobile terminal device is in the folded mode at the start time of the reserved viewing, the control unit 122 reads out the fourth set value from the set value table stored in the initialization unit 121 and assigns the value to a variable N4 (S1401). Then, the control unit 122 determines a value of the variable N4 (S1402).

When N4=1, the control unit 122 controls the TV reception unit 101 and the recording control unit 116 so that the television recording is started instead of the television display (S1411) and causes the notification unit 123 to notify that the television recording is currently being performed (S1412). The notification unit 123 makes this notification using the sub display that is visible to the user even in the folded mode or using the speaker.

When N4=2, the control unit 122 controls the TV reception unit 101, the TV processing unit 102, and the output control unit 108 so that the television display is started (S1421). Note that the television display in this case is performed in a standby state where only the backlight is turned off so that the television display can be started immediately after the folded mode is canceled (that is, the mobile terminal device is unfolded). Moreover, the control unit 122 causes the notification unit 123 to notify that the television display has been started (S1422). This notification may be made as a message saying "The reserved television display has been started" displayed on the sub display, or as a voice message saying "The reserved television display has been started" or a beeping sound outputted from the speaker, for example.

When N4=3, the control unit 122 causes the notification unit 123 to notify that it is time to start the reserved television display (S1432) and to inquire of the user whether to start the television display or the television recording (S1433). When the television recording is selected through the user operation, the television recording is started (S1434). Meanwhile, when the television display is selected through the user operation, the television display is started (S1435).

It should be noted that, in the control processing 4 in FIG. 11, the television display may be shown at the start time on the sub display that is visible even in the folded mode.

Figure 12:
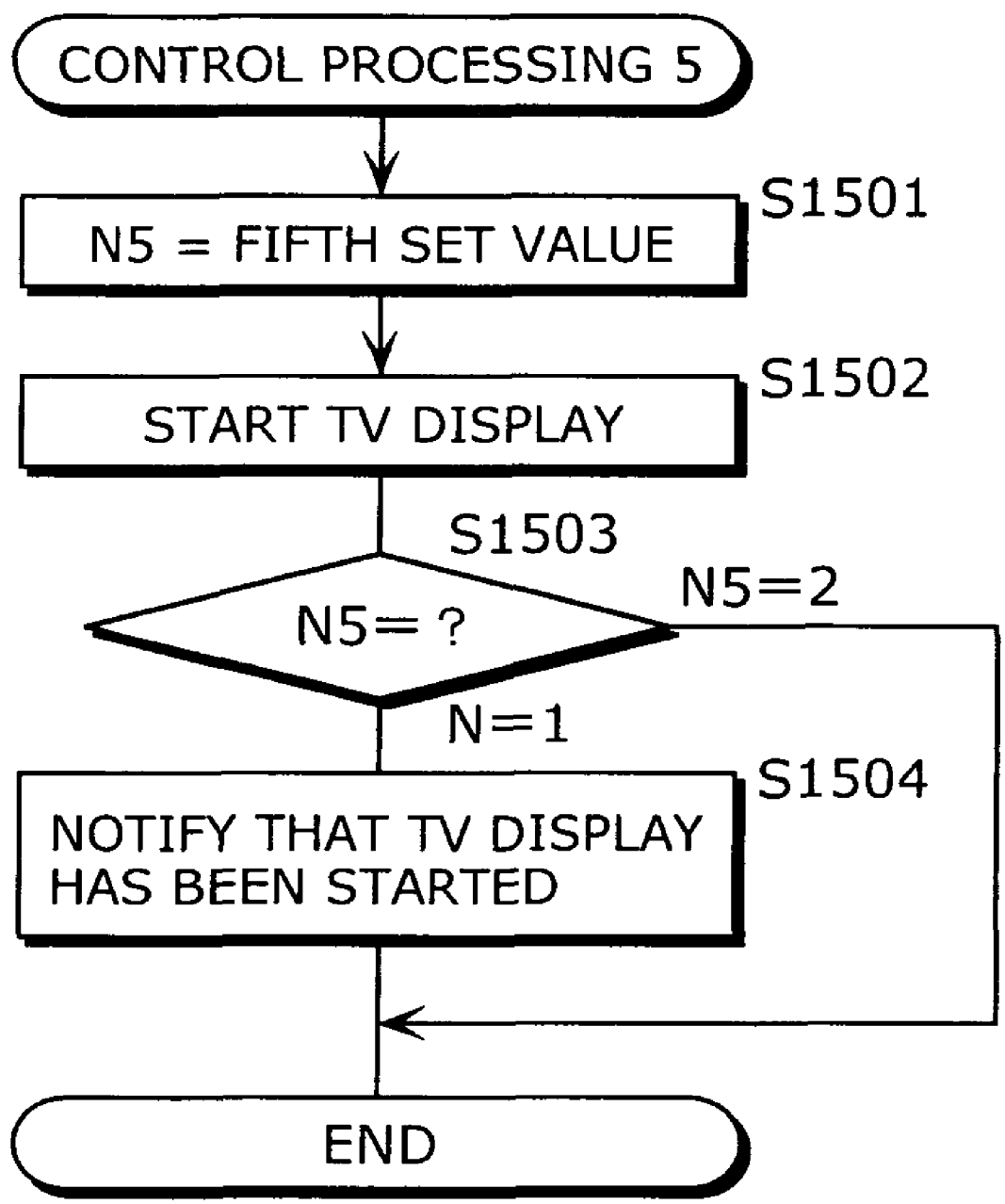
FIG. 12 is a flowchart showing details of control processing 5.

FIG. 12 is a flowchart showing the details of the control processing 5. As shown in this diagram, when the mobile terminal device is in the standby mode at the start time of the reserved viewing, the control unit 122 reads out the fifth set value from the set value table stored in the initialization unit 121 and assigns the value to a variable N5 (S1501). Then, the control unit 122 has the television display started (S1502). When N5=1, the control unit 122 causes the notification unit 123 to notify that the television program is currently being displayed (S1503). When N5=2, the control unit 122 does not cause the notification unit 123 to notify that the television program is currently being displayed. Accordingly, in addition to the advance notice that is given the predetermined period of time prior to the start time, the mobile terminal device can make the notification at the start time.

As described so far, according to the mobile terminal device of the embodiment of the present invention, both the reserved viewing of the television broadcast and a different mode can be continued, and this can be realized by the simple and easy operation.

In the stated embodiment, the explanation has been given specifically as to the case where the operation modes of the mobile terminal device are the email creation mode, the reproduction mode, the voice call mode, the video call mode, the data communication mode, the folded mode, and the standby mode, for example. However, the present invention is not limited to these and has more applicability. For instance, the operation modes may include various kinds of modes, such as a phonebook editing mode, an application program execution mode, a schedule editing mode, a calendar mode, a voice recorder mode, a music reproduction mode, a camera mode (including a moving picture taking mode and a still picture taking mode), a remote controller mode, an infrared communication mode, and a game mode. In these cases, the mobile terminal device can also control the reserved television display and the operation mode as is the case with the stated embodiment.

Figure 13:
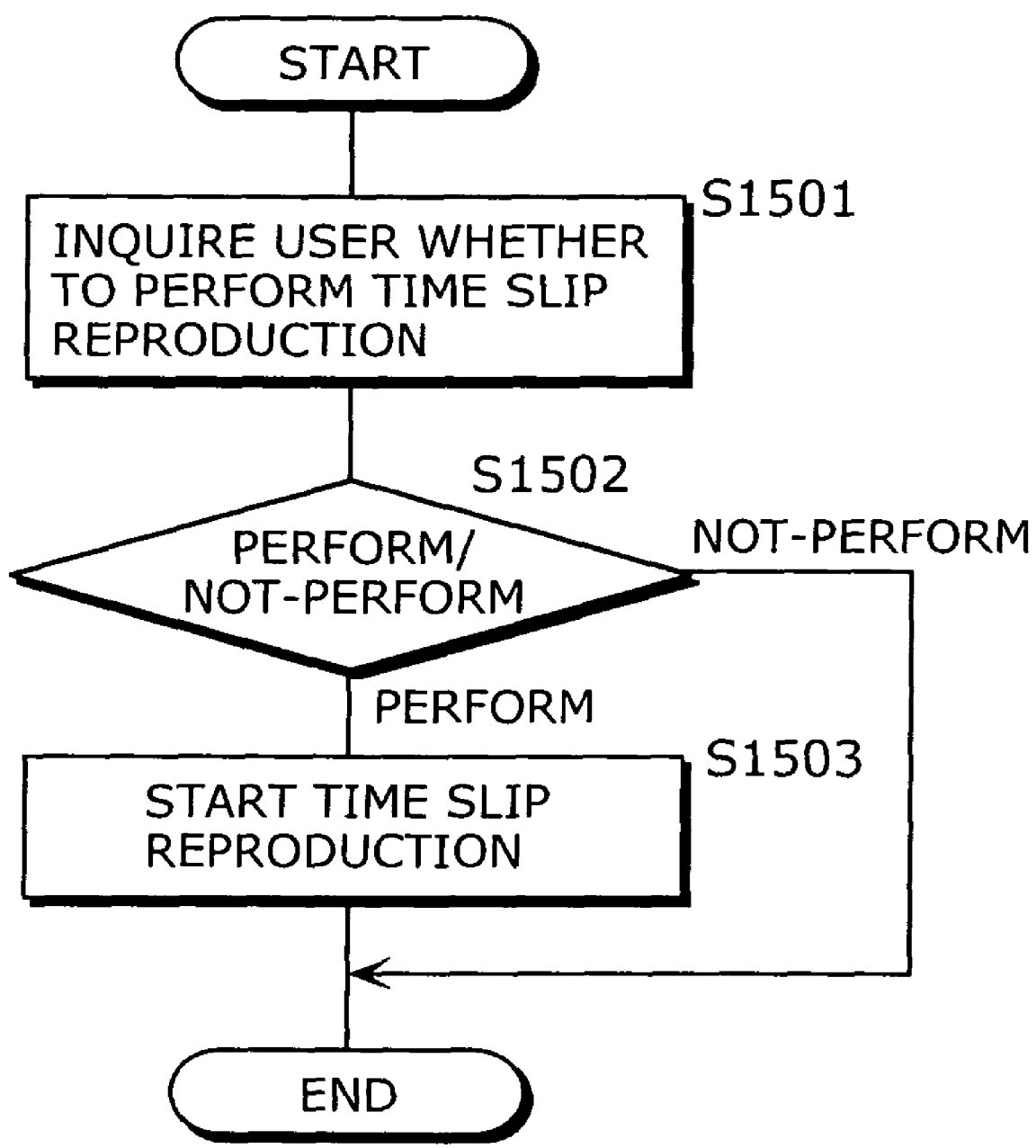
FIG. 13 is a flowchart showing control for making an inquiry about whether to perform a time slip reproduction.

Moreover, in the stated embodiment, after the television recording was started, the user may be inquired whether to perform a so-called time slip reproduction for the program currently being recorded onto the recording medium 115. The control flow for the time slip reproduction in this case is shown in FIG. 13. In this diagram, the control unit 122 instructs the notification unit 123 to inquire of the user whether or not to perform the time slip reproduction (S1501), then judges whether or not a response made through the user operation is "Perform the time slip reproduction" (S1502). When judging that the response is "Perform the time slip reproduction", the control unit 122 controls the execution of the time slip reproduction (S1503). The control flow shown in this diagram may be executed immediately after or in place of the stated S942, S1114, S1214, and S1314. Alternatively, the control flow may be executed after a predetermined period of time has elapsed from S1412 or after a predetermined period of time has elapsed from S1434.

Furthermore, the explanation was given as to the case where, when the first set value is "4" in FIG. 6A (N1=4 as in FIG. 8), the email in progress of creation continues to be displayed and the television recording is started instead of the television display at the start time. Alternatively, the email creation mode may be continued and the sound of television broadcasting may be reproduced without the television display, at the start time.

Figure 14:
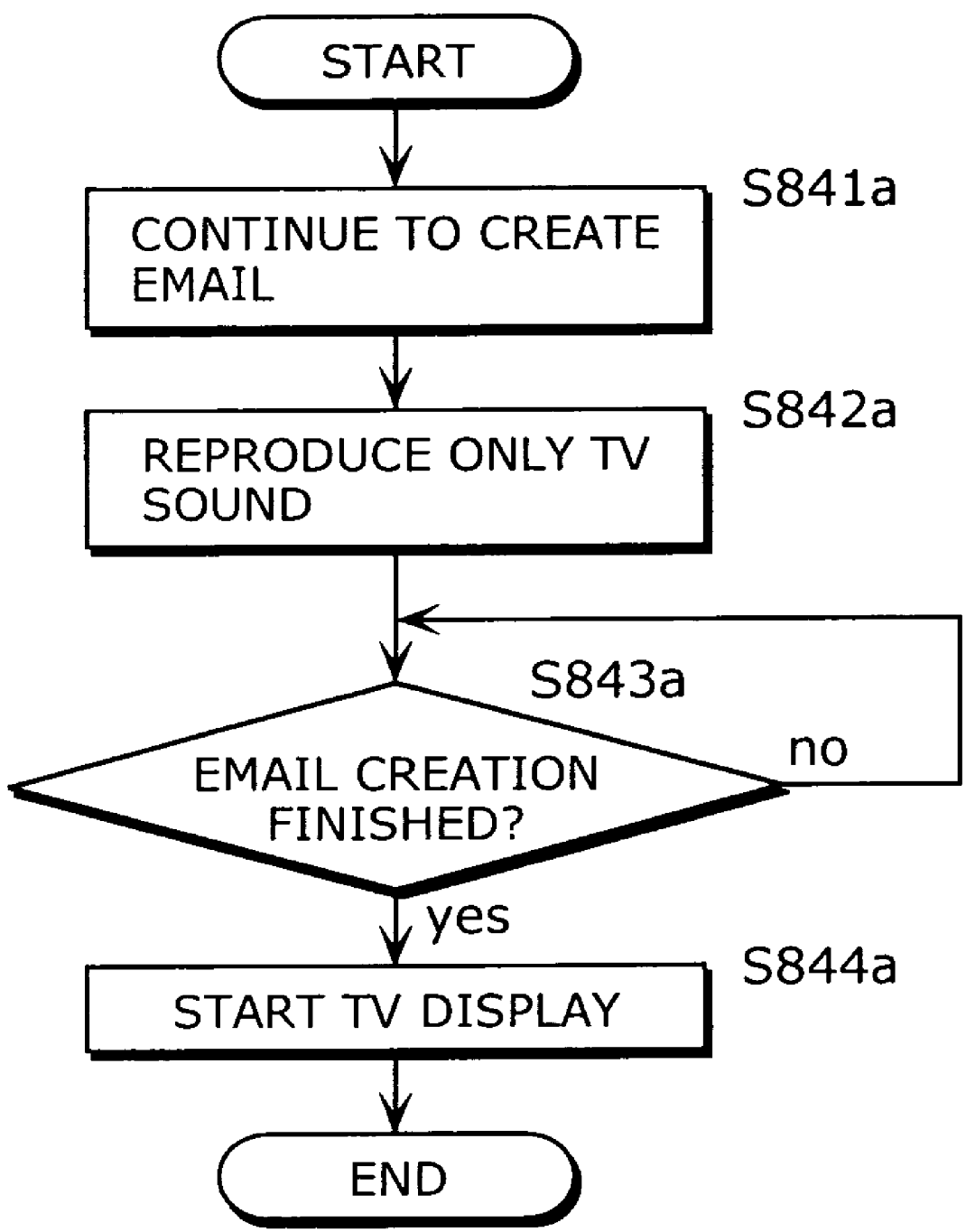
FIG. 14 is a flowchart showing an example of a partial modification of the processing shown in FIG. 8.

In this case, in place of the steps S841 to S849 in FIG. 8, the control unit 122 may execute steps S841a to S844a shown in FIG. 14. To give a more detailed explanation, when N1=4, the control unit 122 causes the email processing unit 106 to continue the email creation mode (S841a) and controls the TV reception unit 101, the TV processing unit, the output control unit 108, and the audio reproduction unit 110 so that only the sound of television broadcasting is reproduced without the television display (S842a). Only the sound of television broadcasting is reproduced in a state where the user can continue to create the email. Moreover, the control unit 122 judges whether or not the email creation mode has been terminated (S843a). When judging that the email creation mode has been terminated, the control unit 122 controls the output control unit 108 and the display unit 109 so that the television display is started in addition to the sound of television broadcasting in progress of reproduction (S844a).

Also, when the first set value is "4", the email in progress of creation continues to be displayed and the television recording is started instead of the television display at the start time. In addition to this, when the first set value is "6", the email creation mode may be continued and the sound of television broadcasting may be reproduced without the television display at the start time. Moreover, the selection made by the user from the first set value "1 to 4 and 6" may be received.

In the above embodiment, the explanation has been given as to the case of the one-segment digital broadcasting as an example. Note that the TV reception unit 101 and the TV processing unit 102 may receive and reproduce analog broadcasting.

Moreover, all the functional blocks shown in the block diagram of FIG. 1 are realized as an LSI which is typically an integrated circuit device. This LSI may be integrated into a single chip or into a plurality of chips (for example, the functional blocks except for the memory may be integrated into one chip). Although referred to as the LSI here, it may be referred to as an IC, a system LSI, a super LSI, or an ultra LSI depending on the scale of integration.

A method for circuit integration is not limited to application of an LSI. It may be realized using a dedicated circuit or a general purpose processor. After an LSI is manufactured, an FPGA (Field Programmable Gate Array) which is programmable or a reconfigurable processor for which the connections and settings of circuit cells inside the LSI are reconfigurable may be used.

Furthermore, if a circuit integration technology that replaces LSIs comes along owing to advances of the semiconductor technology or to a separate derivative technology, the functional blocks should be understandably integrated using that technology. There can be a possibility of adaptation of biotechnology, for example.

Also, among all the functional blocks, only the unit for storing the data may not be integrated into the single chip, and separately structured like the recording medium 115 of the present embodiment.

It should be noted that the central part including the control unit 122 among all the functional blocks shown in the block diagram of FIG. 1 and each flowchart shown in FIG. 7 to FIG. 13 are realized by a processor and its programs.

INDUSTRIAL APPLICABILITY

The present invention is suitable for television-equipped mobile terminal devices, such as a television-equipped mobile phone, a television-equipped PDA (Personal digital assistant), a television-equipped electronic book device, a television-equipped electronic dictionary, a television-equipped mobile personal computer, and a television-equipped mobile DVD (Digital Versatile Disc) recording/reproduction device.

The invention claimed is:

1. A mobile terminal device for reproducing a television broadcast signal, said mobile terminal device comprising:
a holding unit operable to hold a start time at which a television reproduction for a reserved viewing is to be started;
a control unit operable to perform a control so that the television reproduction is started at the start time; and
a determination unit operable to determine a current operation mode of said mobile terminal device,
wherein said control unit is further operable to control the determined operation mode and the television reproduction for the reserved viewing to avoid a collision of the reserved viewing with the determined operation mode,
wherein said mobile terminal device further comprises a recording unit operable to record a television broadcast onto one of a memory in a main body of said mobile terminal device and a removable recording medium, wherein when the operation mode at the start time is an email creation mode, said control unit is operable to perform a control in accordance with a selection made by the user from among: (a) temporarily saving an email that is currently being created at the start time; (b) displaying both the email currently being created and video by the television reproduction; (c) causing said recording unit to perform the recording instead of the television reproduction; and
(d) continuing the email creation mode and reproducing a sound of a television broadcast without a television display, and
wherein when the selection made by the user is (c) causing said recording unit to perform the recording instead of the television reproduction, after the email creation mode is terminated, said control unit is further operable to notify the user that the recording of the television broadcast is currently being performed by the recording unit.

2. The mobile terminal device according to claim 1, wherein when the operation mode is an email creation mode, said control unit is operable to have an email in progress of creation and the television reproduction displayed at the start time respectively on: (a) two split areas obtained by splitting one display area into two; or (b) two separate display panels.

3. The mobile terminal device according to claim 1, wherein after the email creation mode is terminated, said control unit is further operable to inquire of the user whether or not to reproduce the television broadcast recorded by said recording unit.

4. The mobile terminal device according to claim 1, wherein said control unit is operable to inquire of the user at the start time which one the user is to select from among the above (a) to (d).

5. The mobile terminal device according to claim 1, further comprising
a detection unit operable to detect an end time of the program which is currently being recorded by said recording unit, on the basis of broadcasted electronic program guide information,
wherein the stop condition is the end time detected by said detection unit, and
wherein when the end time is detected by said detection unit, said control unit is operable to cause said recording unit to stop the recording.

6. The mobile terminal device according to claim 5, wherein when a user operation is performed to stop the recording, said control unit is operable to cause said recording unit to stop the recording.

7. A control method for a mobile terminal device which reproduces a television broadcast signal, the mobile terminal device including a recording unit that records a television broadcast onto one of a memory in a main body of the mobile terminal device and a removable recording medium, said control method comprising:
a reception step of receiving a start time at which a television reproduction for a reserved viewing is to be started, in accordance with a user operation;
a determination step of determining a current operation mode of the mobile terminal device; and
a control step of performing a control so that the television reproduction is started at the start time,
wherein the determined operation mode and the television reproduction for the reserved viewing are controlled at the start time to avoid a collision of the reserved viewing with the determined operation mode in the control step,
wherein when the operation mode at the start time is an email creation mode, a control is performed in said control step in accordance with a selection made by the user from among: (a) temporarily saving an email that is currently being created at the start time; (b) displaying both the email currently being created and video by the television reproduction; (c) causing said recording unit to perform the recording instead of the television reproduction; and (d) continuing the email creation mode and reproducing a sound of a television broadcast without a television display, and
wherein when the selection made by the user is (c) causing said recording unit to perform the recording instead of the television reproduction, said control step further comprises notifying the user, after the email creation mode is terminated, that the recording of the television broadcast is currently being performed by the recording unit.

8. A non-transitory computer-readable recording medium on which a program executed by a computer included in a mobile terminal device that reproduces a television broadcast signal is recorded, the mobile terminal device including a recording unit that records a television broadcast onto one of a memory in a main body of the mobile terminal device and a removable recording medium, and the program causing the computer to execute a method comprising:
a reception step of receiving a start time at which a television reproduction for a reserved viewing is to be started, in accordance with a user operation;
a determination step of determining a current operation mode of the mobile terminal device; and
a control step of performing a control so that the television reproduction is started at the start time,
wherein the determined operation mode and the television reproduction for the reserved viewing are controlled at the start time to avoid a collision of the reserved viewing with the determined operation mode in the control step,
wherein when the operation mode at the start time is an email creation mode, a control is performed in said control step in accordance with a selection made by the user from among: (a) temporarily saving an email that is currently being created at the start time; (b) displaying both the email currently being created and video by the television reproduction; (c) causing said recording unit to perform the recording instead of the television reproduction; and (d) continuing the email creation mode and reproducing a sound of a television broadcast without a television display, and
wherein when the selection made by the user is (c) causing said recording unit to perform the recording instead of the television reproduction, said control step further comprises notifying the user, after the email creation mode is terminated, that the recording of the television broadcast is currently being performed by the recording unit.

9. An integrated circuit device for controlling a mobile terminal device that reproduces a television broadcast signal, the mobile terminal device including a recording unit that records a television broadcast onto one of a memory in a main body of the mobile terminal device and a removable recording medium, and said integrated circuit device comprising:
a holding unit operable to hold a start time at which a television reproduction for a reserved viewing is to be started;
a control unit operable to perform a control so that the television reproduction is started at the start time; and a determination unit operable to determine a current operation mode of the mobile terminal device, wherein said control unit is further operable to control the determined operation mode and the television reproduction for the reserved viewing to avoid a collision of the reserved viewing with the determined operation mode, wherein when the operation mode at the start time is an email creation mode, said control unit is operable to perform a control in accordance with a selection made by the user from among: (a) temporarily saving an email that is currently being created at the start time; (b) displaying both the email currently being created and video by the television reproduction; (c) causing said recording unit to perform the recording instead of the television reproduction; and (d) continuing the email creation mode and reproducing a sound of a television broadcast without a television display, and wherein when the selection made by the user is (c) causing said recording unit to perform the recording instead of the television reproduction, after the email creation mode is terminated, said control unit is further operable to notify the user that the recording of the television broadcast is currently being performed by the recording unit.

\* \* \* \* \*